Dec. 16, 1941. G. J. HUNTLEY ET AL 2,266,497
FILLING MACHINE
Original Filed May 15, 1933 12 Sheets-Sheet 4

Inventors
George J. Huntley
Robert J. Stewart
By Cushman, Darby & Cushman
Attorneys

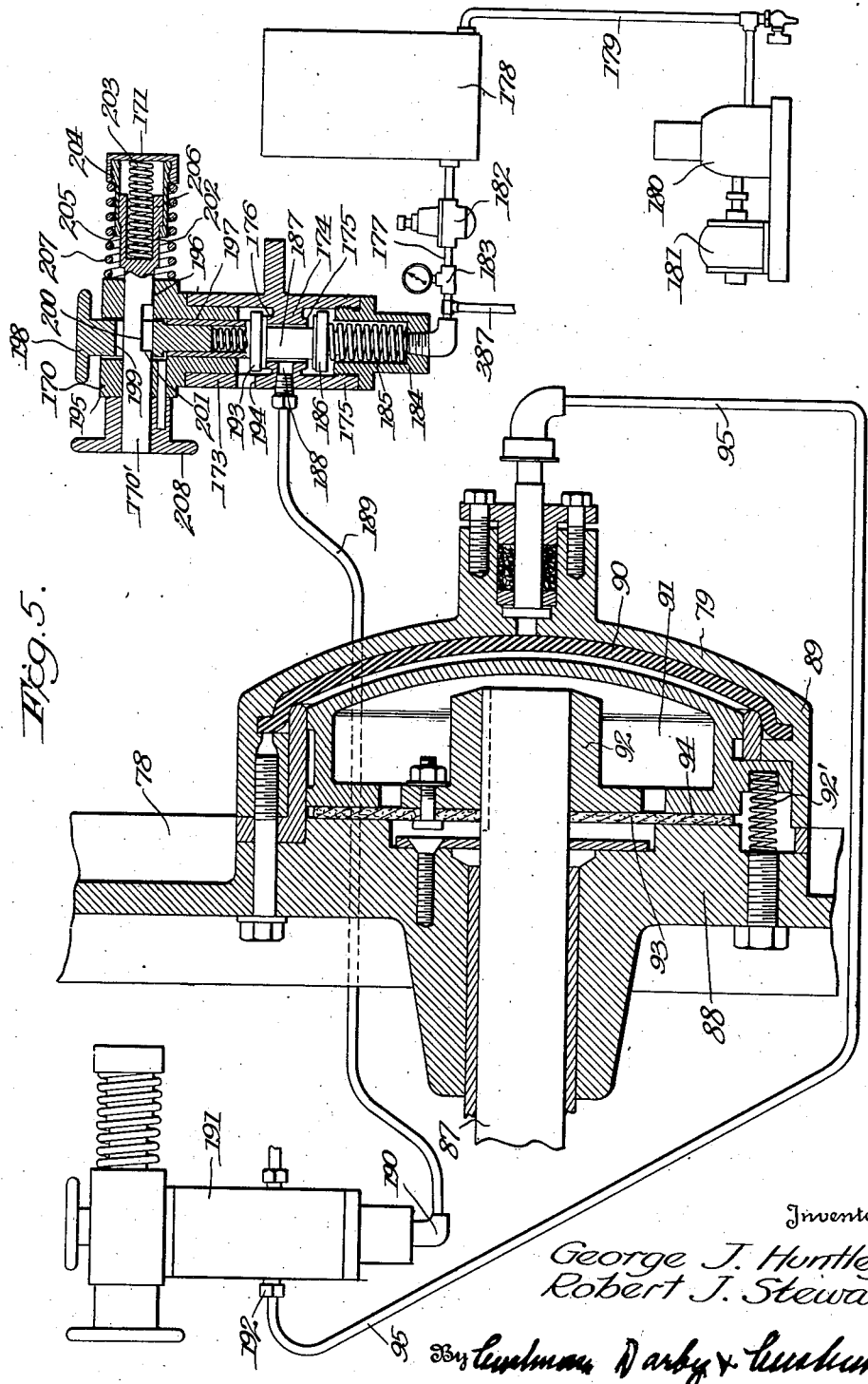

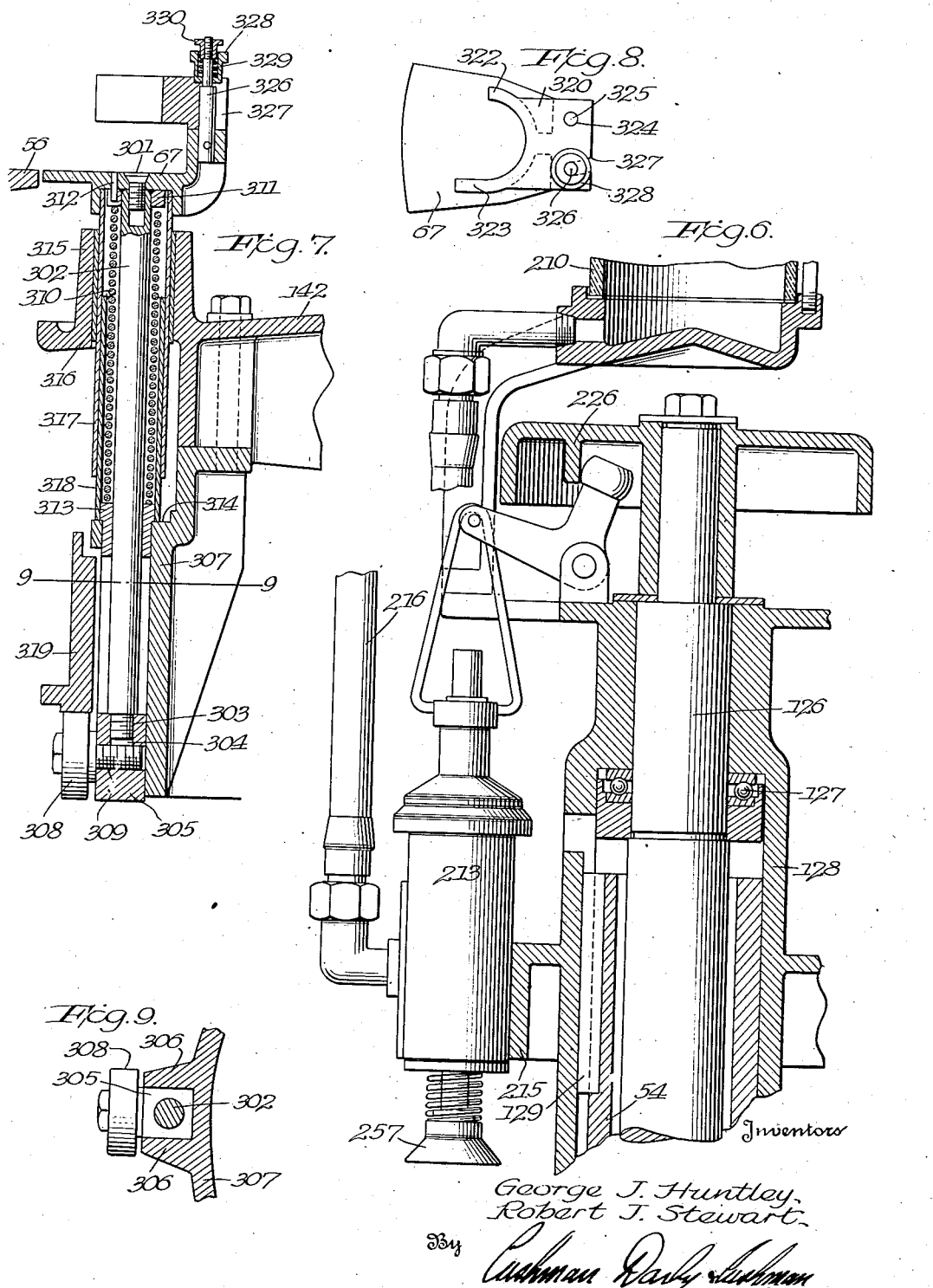

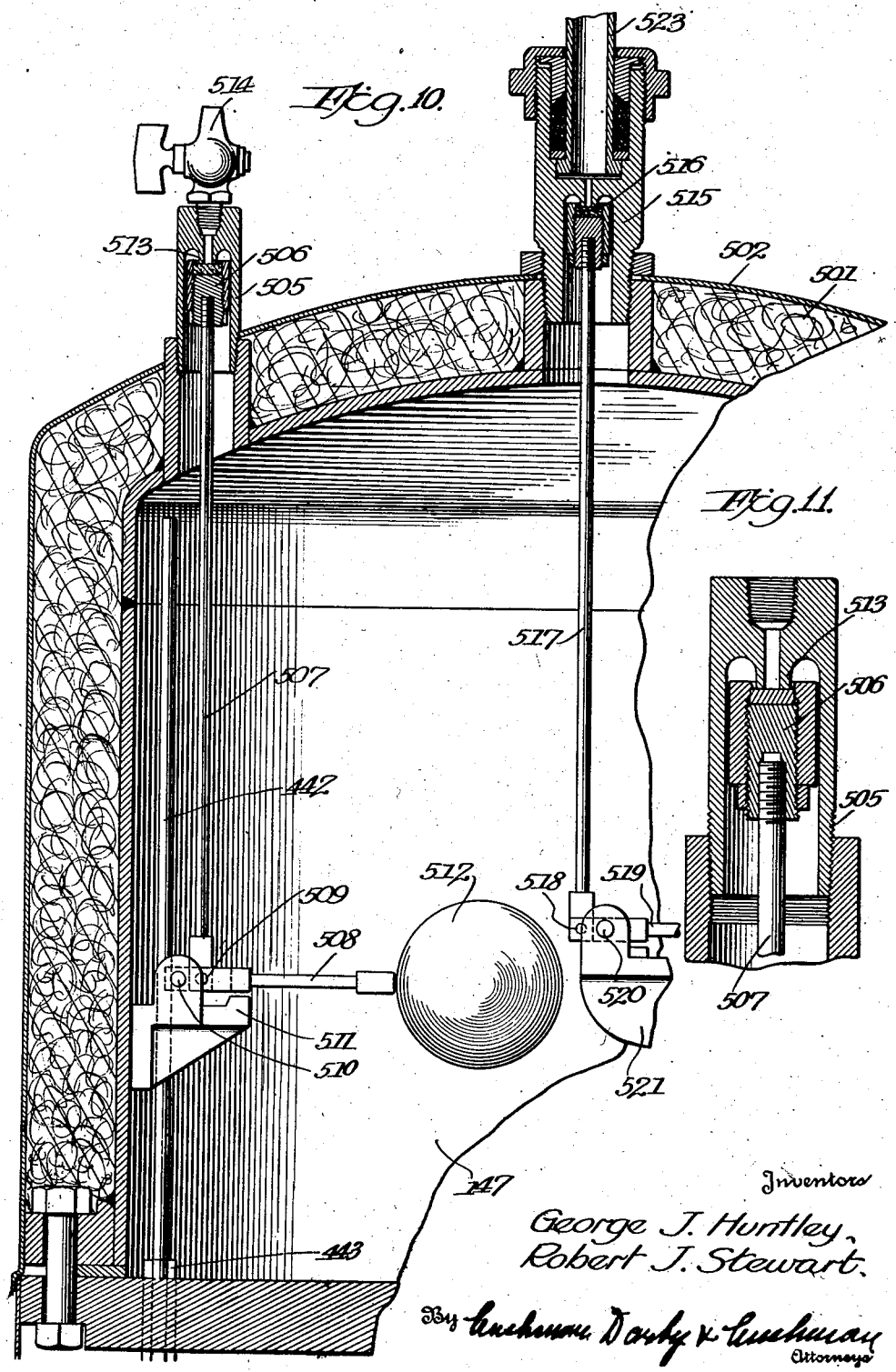

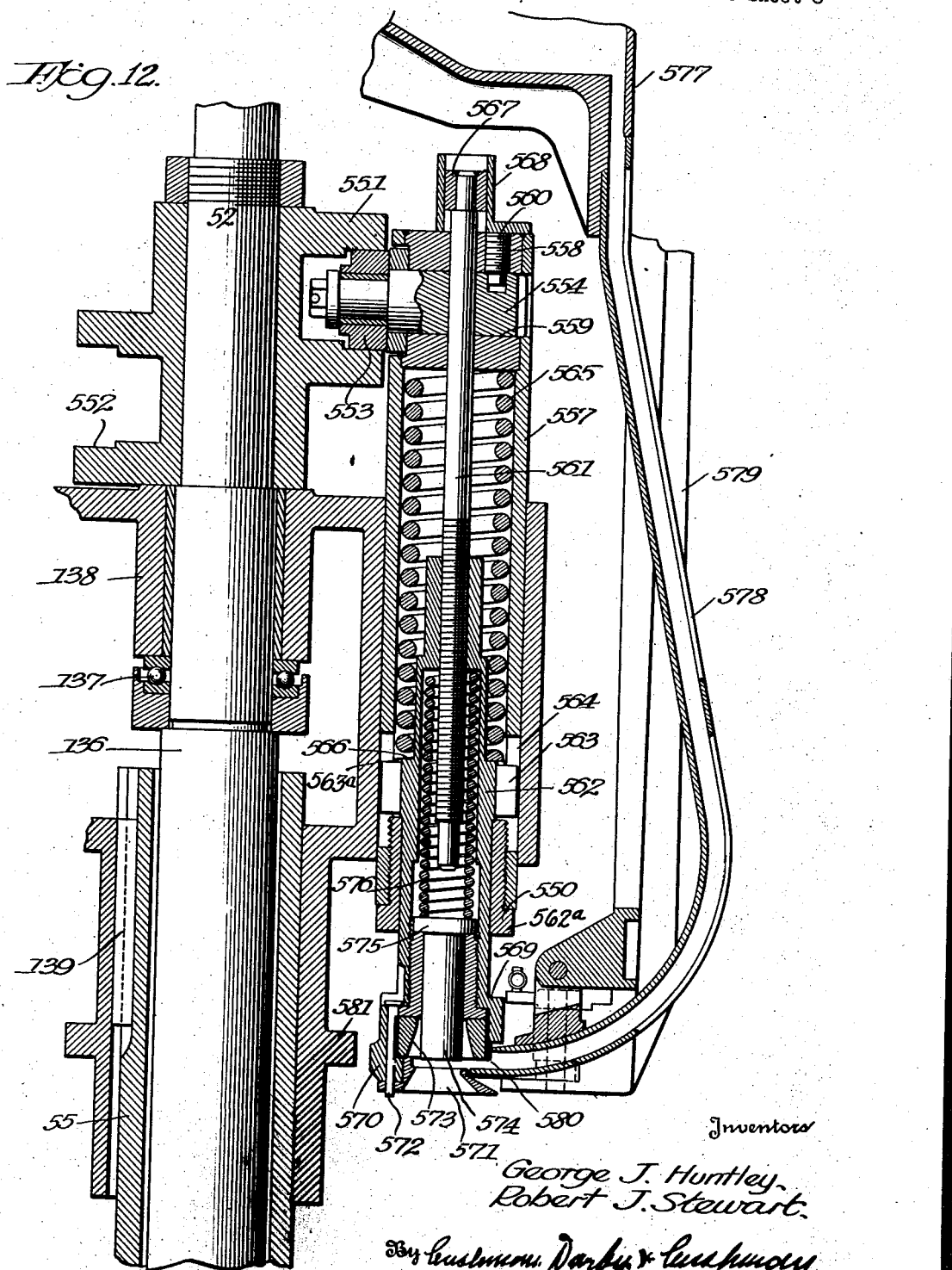

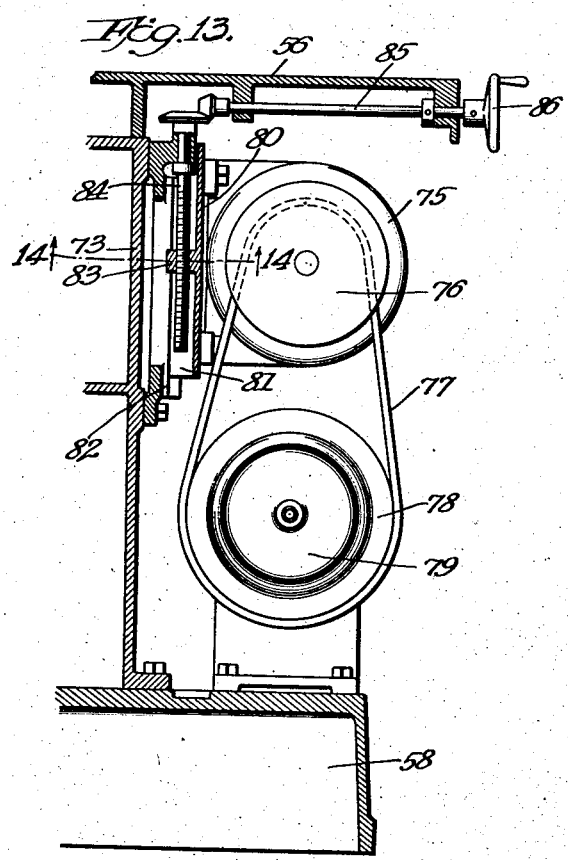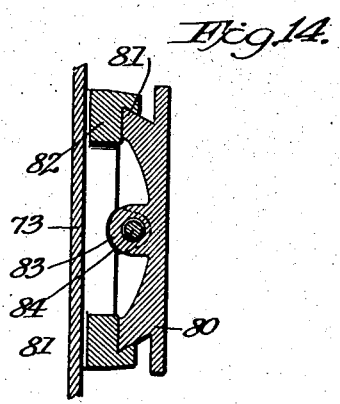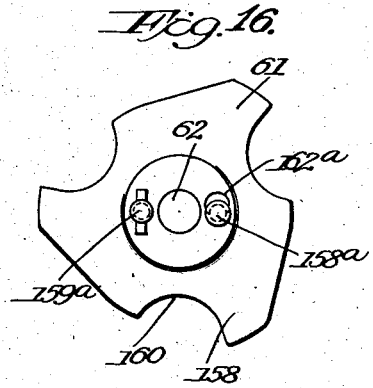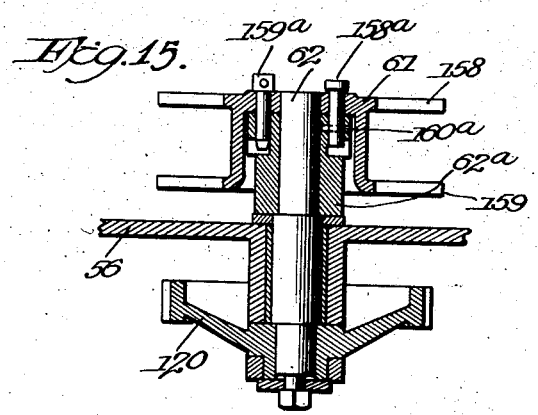

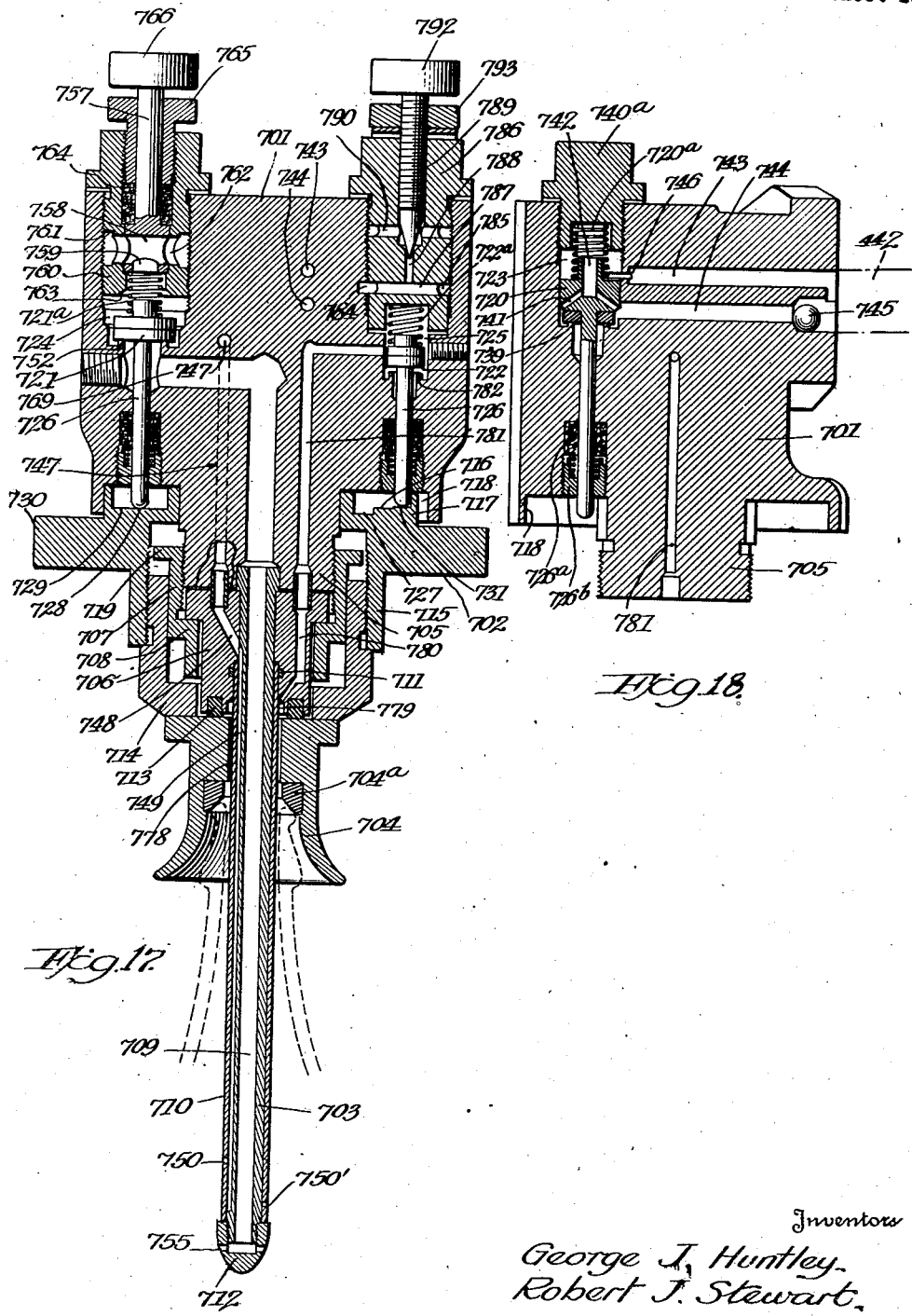

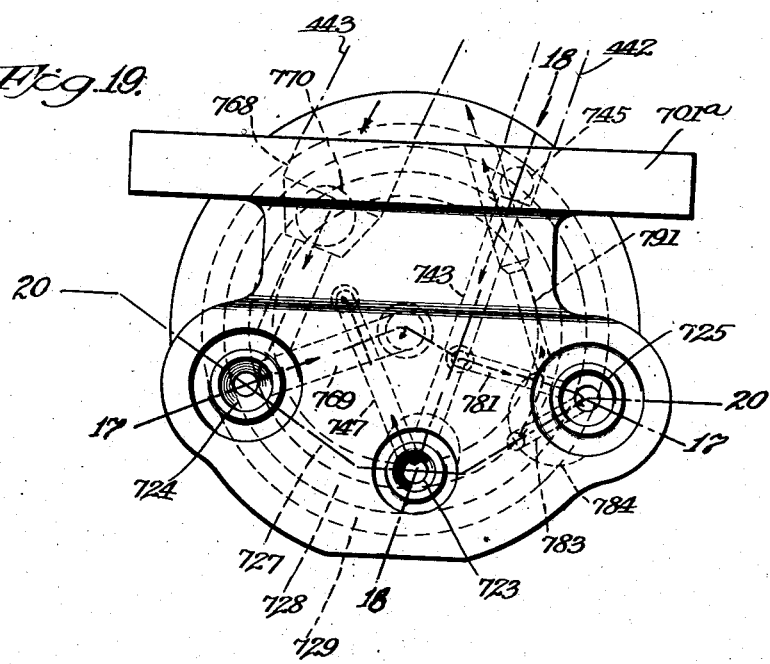

Dec. 16, 1941.    G. J. HUNTLEY ET AL    2,266,497
FILLING MACHINE
Original Filed May 15, 1933    12 Sheets-Sheet 12

Inventors
George J. Huntley,
Robert J. Stewart.

Attorneys

Patented Dec. 16, 1941

2,266,497

UNITED STATES PATENT OFFICE 2,266,497

FILLING MACHINE

George J. Huntley and Robert J. Stewart, Baltimore, Md., assignors to Crown Cork & Seal Company, Inc., Baltimore, Md., a corporation of New York Original application May 15, 1933, Serial No. 671,266. Divided and this application April 19, 1938, Serial No. 202,998

10 Claims. (Cl. 226—98)

The present invention relates to a filling machine and, more particularly, to a machine of this type which includes separate syruping, filling and crowning mechanisms. The present application is a division of our application for Filling machines, Serial No. 671,266, filed May 15, 1933, Patent No. 2,145,765, issued January 31, 1939.

Filling machines including syruping, filling and crowning means are known in the art, but in most of these prior machines two or more of the three necessary operations, i. e., syruping, filling and crowning, have usually been carried out under a single mechanism. For example, in one form of the prior machines, a single mechanism has been provided to syrup and fill bottles and a second mechanism has performed the crowning while in another type of machine, a syruping mechanism has been included in the machine to operate with a mechanism which both fills and crowns the bottles. These prior machines are not entirely satisfactory because of the fact that they do not enable the bottles to be passed through the machine at the greatest possible rate of speed. In bottling carbonated beverages, the operation which requires the longest time is that of filling the bottle with the carbonated water, since each bottle ordinarily receives approximately six parts of water to one part of syrup. If the water could be delivered into the bottle with such rapidity that the six parts of water could be placed in one bottle while another bottle is receiving one part of syrup, the timing of the prior art machines could be more efficiently arranged. However, in the bottling of carbonated beverages, it is necessary that the six parts of carbonated water be delivered to the bottle at about the same rate of flow as the one part of syrup. Hence, the filling operation is six times as long as the syruping operation. Crowning, like syruping, is a comparatively short or rapid operation, and requires about the same length of time as syruping. Because of the factors mentioned above, in machines wherein two of the three necessary operations are carried out by a single mechanism, the third operation, either syruping or crowning, must be conducted at a slow speed in order that the capacity of the machine for performing the filling or carbonated water delivering operation will not be exceeded.

Filling machines have also been constructed in which the syruping, filling and crowning operations are carried out by separate mechanisms, but, in these prior art machines, the feeding of the bottles through the machine and the operations performed upon the bottles are so designed and carried out that the bottles are unduly agitated during their passage through the machine. Agitation of the bottles in the type of filling machine generally referred to in the trade as a "high-low machine" is extremely undesirable, since in this type of machine a bottle is filled while there is a relatively high pressure in the bottle, this pressure being released after the filling to place the contents of the bottle at atmospheric pressure before it is moved to the crowning mechanism. If the liquid in the bottle is agitated in any way during its movement through the filling mechanism and prior to being crowned, either because of bodily movement of the bottle or the manner in which the filling liquid is placed in the bottle, the charged water with which the bottles are filled tends to lose its gas, and bubbles of gas rise in the bottle. If gas once begins to rise in the bottle, the upward movement of bubbles rapidly increases with a cumulative effect and when the bottle is released to atmospheric pressure after the filling is completed, the contents will foam and much of the liquid in the bottle will be wasted.

The principal object of the present invention is to provide a syruping, filling and crowning machine wherein the three operations of the machine will be performed by separate mechanisms, thereby permitting each of the respective mechanisms to include a number of heads, each head performing the operation for which the respective mechanism is designed, and the number of heads in the respective mechanisms being so gauged that the timing of the entire machine will enable bottles to be moved smoothly and rapidly through the machine without the action of one mechanism being delayed to await the action of another mechanism. Since the syruping and crowning operations require approximately the same length of time, the number of the heads in these two mechanisms is the same, while for most satisfactory operation, six times the number of filling heads, as compared with the respective number of syruping and crowning heads, is provided.

Another object of the invention is to provide a filling machine and a drive therefor, whereby the bottles will be moved through the machine at a constant rate of speed and with a minimum disturbance of the contents of the bottles.

In filling bottles with charged beverages by the "high-low" method referred to above, it is customary to seal each bottle to a filling head for the filling operation, the filling head being connected by suitable piping to a filling reservoir elevated above the filling head and containing charged water and, above the water, a body of gas. The first step of the filling operation is to establish a pressure, generally referred to as "counter-pressure," in the bottle, this pressure being equal to the pressure of the gas above the water in the water and gas reservoir. The second operation is to permit the charged water to flow from the reservoir into the bottle through the filling head. Since the pressure in the bottle and the pressure in the reservoir are now identical, the water only flows into the bottle by reason of the head of water resulting from the elevation of the reservoir above the bottle and as the reservoir is not greatly elevated above the filling head, the flow of water will be comparatively slow. During the flow of water into the bottle, the pressure in the bottle is vented back to the reservoir, but the filling is terminated before the level of the water in the bottle reaches the mouth of the bottle, and the air and gas confined above the level of the water will be compressed by the rising water. In order to gradually release this pressure before the mouth of the bottle is opened to the atmosphere, a third step, snifting, is performed, comprising releasing the pressure above the surface of the water in the bottle through a very small vent. The bottle is then moved out of engagement with the filling head.

The filling system used with the present machine is generally similar to the well known "English" filling system, but the various novel arrangements of the structure discussed above whereby the filling is conducted and other arrangements which will be apparent from the specification and drawings, eliminate all of the disadvantages of the English filling system, an important object of the present invention being to provide a filling machine which will operate in accordance with the English or "high-low" filling system but which is so substantially improved over machines constructed to operate in accordance with that system as to develop the full advantages of the system.

The filling nozzle preferably used with the present machine includes a bottle centering bell which is slidable upon the filling nozzle, so that the mouth of the bottle will be properly centered about the nozzle before the nozzle moves into the bottles. During the filling operation, the centering bell and the filling head proper are sealed together with an air-tight joint and the bottle is snifted through the centering bell and the filling head.

An important object of the present invention is to provide a filling head including a reciprocable filling valve or valves and in which there will be no friction between the valve body and the valves. More particularly, this feature of our invention involves the provision of a filling head which is provided with poppet valves instead of the usual rotatable disc valve.

The use of the usual type of filling heads including a rotary disc valve results in a number of disadvantages other than the friction between the valve body and valve which has been heretofore discussed. The disc valves used generally move in a vertical plane and on a horizontal axis, requiring that the valve operating arm or arms extend in a vertical plane for actuation by a horizontally projecting trip secured to the base of the machine. It is usual to so construct the filling machine that it may be used to operate on runs of bottles of various sizes and heights, this arrangement of the machine requiring that the filling heads be raised or lowered to operate upon runs of bottles of different heights. The adjustment of the height of the filling head also necessitates the adjustment of the horizontally projecting filling head valve operating trips, and in order to properly position each of these trips, the adjusting operation must be very carefully conducted.

In our poppet type of filling valve, the valves move vertically, being operated by a cam plate which rotates in a horizontal plane and on a vertical axis. The cam plate is caused to rotate with a step by step movement by contact of radially projecting arms on the cam plate with vertical trips or posts fixed to the base of the machine. By this arrangement, the filling head may be vertically adjusted for bottles of different heights without the necessity of any adjustment of the trips or post, since it is merely necessary to make the trips or posts of sufficient length to contact with the radially projecting arms on the valve operating cam plate at any adjusted position which the latter may possibly occupy.

A further object of our invention in connection with the use of a valve of the vertically movable or poppet type is to so construct the filling head that the head will be inoperative for every step of the filling operation when no bottle is positioned beneath the head, this result being obtained entirely automatically by the structure of the head itself and without the necessity of providing any means to move the vertical filling trips or posts to inoperative position.

We accomplish the object set forth above by so designing the filling head that the valve operating cam plate will be out of operative relation with the valves except when a bottle is positioned beneath the filling head. When no bottle is beneath the filling head, the valve operating cam plate of the filling head will be given its usual unidirectional step by step movement by the vertical trips or posts, but without operating the valves. The movement of the cam plate in regular sequence even when the valves are not operated will prevent the cam plate from getting out of step or timed relation with respect to the cycle of operation of the filling head valves.

Another advantage resulting from the use of a cam plate which will be out of operative relation with the valves when no bottle is pressed upwardly against the filling head is that the breakage or explosion of a bottle during the time that it is positioned beneath the filling head will cause the valve operating cam plate to drop from operative relation with the poppet valves, thereby restoring all the valves of the head to normal or closed position. Since the valve operating cam plate is held in operative relation to the valves by the bottle, and as the exploding or breaking of a bottle during filling normally causes the bottle to collapse, the cam plate will drop downwardly from operative position.

Another important object of the invention is to provide a filling machine including a drive which will permit the machine to operate with increased efficiency and which comprises a minimum number of parts.

In the prior art machines of this type, the drive is usually directly from the motor to one of the three principal mechanisms of the machine, i. e., the syruping, filling or crowning mechanisms, and thence to the outer mechanisms. Since the different mechanisms of the machines are of different sizes and carry different numbers of operating heads or bottle engaging devices, somewhat extended gear trains have been necessary to drive each of the principal mechanisms and the various auxiliary mechanisms at their proper speeds.

According to the present invention, the drive from the motor is directly connected to a central element of the entire mechanism of the machine, this element being the transfer mechanism which moves the bottles from the syruping to the filling mechanism and from the latter mechanism to the crowning mechanism. The three principal operating mechanisms are geared substantially directly to the central transfer mechanism and whatever differences in the ratios between the speeds of the various mechanisms is necessary may be made at this point, preferably through gears of the pinion type. This arrangement of the machine whereby the drive for each principal mechanism is taken directly from the transfer mechanism and at its proper speed eliminates a great number of parts and so divides the drive that no long gear trains are necessary and the possibilities of uneven wear are substantially eliminated.

Another object of our invention is to provide a machine which may be operated at relatively high speeds over a long period of time and the parts of which are so arranged that the entire machine may be readily adjusted for various sizes of bottles or to compensate for any wear which may occur.

Another object of the present invention is to provide means to stop the operation of the machine whenever bottles become jammed during their movement through the machine.

It will be understood that the apparatus of the present invention may be used to fill containers of any type with fluids of various natures.

Numerous other objects and advantages of the machine will be apparent from the following specification and drawings, in which:

Figure 5 is a horizontal sectional view of the driving clutch of the machine and the means for controlling the same and includes a diagrammatic showing of the fluid pressure circuit connected therewith;

Figure 6 is a view, partly in vertical section and partly in side elevation, of the syruping mechanism;

Figure 7 is a vertical sectional view through one of the bottle supporting platforms of the filling mechanism, showing the platform in the position it occupies when adjacent the worktable;

Figure 8 is a plan view of one of the bottle supporting platforms;

Figure 9 is a horizontal sectional view on the line 9—9 of Figure 7.

Figure 10 is a vertical sectional view through a portion of the filling reservoir;

Figure 11 is a detail vertical sectional view of the pressure relief valve of the filling reservoir;

Figure 12 is a vertical sectional view through a portion of the crowning mechanism and one of the crowning heads.

Figure 13 is a vertical sectional view through a portion of the base of the machine showing the driving motor and clutch mechanism in front elevation.

Figure 14 is a horizontal sectional view on the line 14—14 of Figure 13.

Figure 15 is a central vertical sectional view through the infeed spider of the machine.

Figure 16 is a top plan view of the infeed spider of Figure 15.

Figure 17 is a vertical sectional view of the poppet valve type filling head of our invention, taken on the line 17—17 of Figure 19, the valves being shown in the position they occupy during the snifting step of the filling cycle.

Figure 18 is a vertical sectional view through the poppet valve type filling head taken on the line 18—18 of Figure 19.

Figure 19 is a top plan elevation of the poppet valve type filling head with the valves removed and with the various ports and passages shown in dotted lines.

Figure 20 is a vertical sectional view on the line 20—20 of Figure 19 showing the ports and passages in dotted lines.

Figure 1:
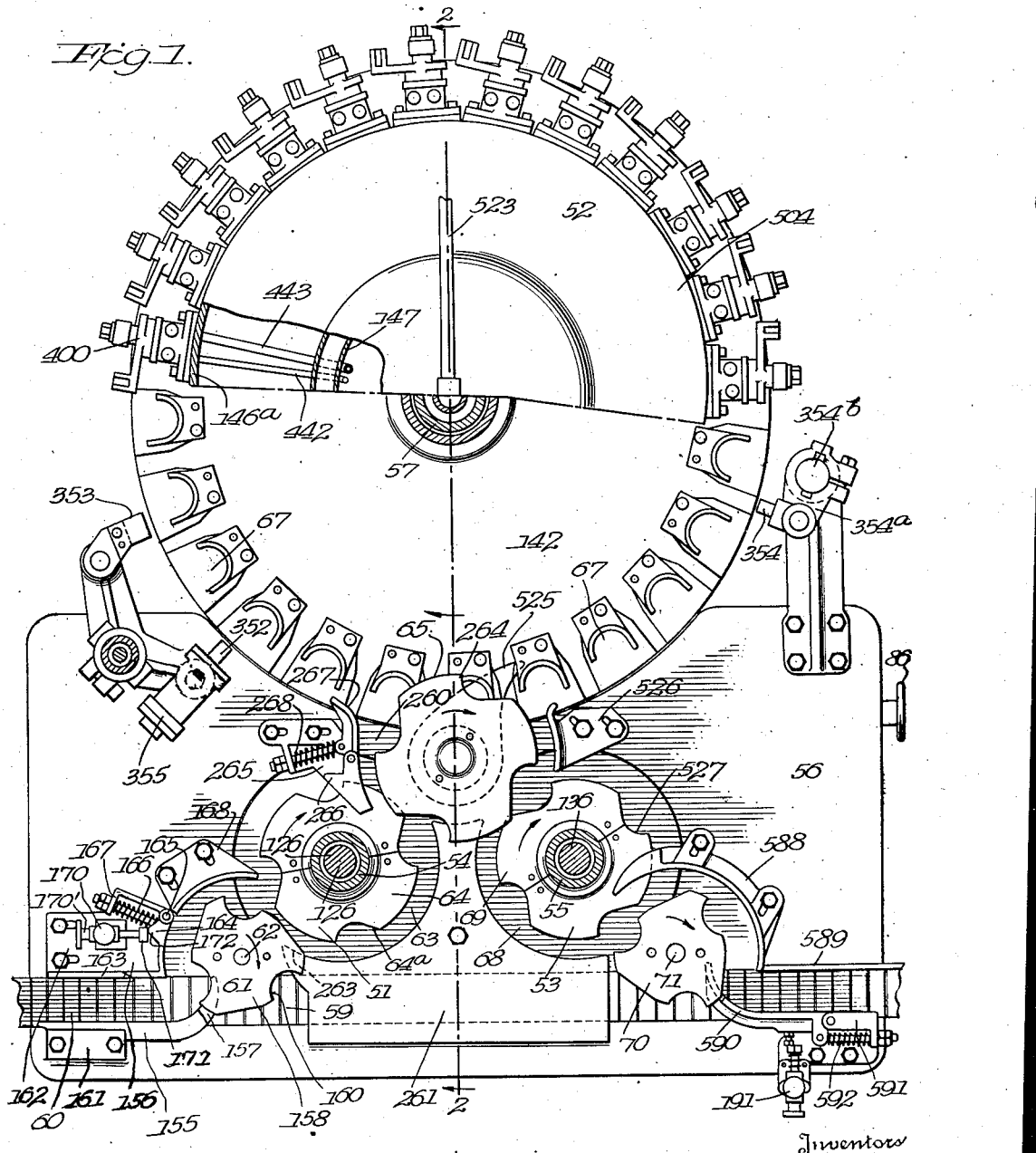
Figure 1 is a horizontal sectional view of the machine taken on the line 1—1 of Figure 2.

Our filling machine comprises a syruping mechanism 51, a filling mechanism 52 and a crowning mechanism 53, the syruping mechanism and crowning mechanism being supported upon hollow rotatable shafts 54 and 55, respectively, extending up through the worktable 56, while the filling mechanism is rotatably supported adjacent the rear edge of the worktable, upon a vertical column 57 extending upwardly from the base 58 of the machine.

As is best shown in Figure 1, a straight line endless conveyor 59 having the surface of its upper run flush with the level of the worktable 56 feeds the bottles into the machine at 60, the bottles being removed from the conveyor 59 by an infeed spider 61 fixed to a stub shaft 62 journalled in the worktable. The bottles are moved about the spider 61 in a clockwise direction to a rotary table 63 and spider 64 included in the syruping mechanism and are removed from the syruping table and spider by a central or transfer spider 65, which is fixed to a vertical shaft 66 journalled in the worktable and base. The transfer spider 65 moves the bottles about its left-hand portion to position them upon bottle supporting platforms 67 spaced about the filling mechanism 52. The rotating filling mechanism moves the bottles thereabout in a clockwise direction (Fig. 1) and returns the bottles, filled, to the right-hand portion of the transfer spider 65. The bottles are removed from the filling mechanism and are moved about the right-hand side of the transfer spider 65 to a rotary table 68 and spider 69 included in the crowning mechanism 53. During the movement of the bottles about the crowning mechanism in a counter-clockwise direction, they are crowned and are removed from the latter mechanism by an outfeed spider 70 secured to a stub shaft 71 journalled in the worktable 56. The outfeed spider 70 moves the bottles in a clockwise direction upon the worktable to the right-hand end of the straight line conveyor 59, which moves the bottles from the machine.

Worktable 56 is carried by a supporting structure comprising side walls 72 and 73 and a front wall 74, all extending upwardly from the base 58.

The driving mechanism and gearing

The machine is driven by means of an electric motor 75, (Figs. 3 and 4) on the shaft of which is mounted a gear changing mechanism 76, preferably of the Reeves type, and comprising two oppose dish-shaped drums mounted upon the motor shaft and pressed toward each other by spring tension. A belt 77 operates between the opposed drums and drives a pulley 78 included in a fluid pressure controlled clutch 79. Change of speed of the drive is effected by varying the position of the belt between the opposed drums and thus with respect to the motor shaft by moving the motor vertically with respect to the clutch pulley 78. To obtain this adjustment, the motor is mounted upon a vertical plate 80 having rearwardly projecting keys 81 (Figs. 3, 13 and 14) which engage a slideway 82 fixed to the side wall 73 of the machine. The plate 80 includes a rearward projection 83 having a threaded bore and through which extends a threaded shaft 84 which is rotatably supported at the upper end of the slideway 82. A bevel gear fixed to the upper end of the shaft 84 is in mesh with a bevel gear fixed to a horizontal shaft 85 journalled on the underside of the worktable, which shaft is provided at its outer end with a hand wheel 86 whereby the shafts 85 and 84 may be rotated. It will be understood that rotation of the shaft 84 will cause the plate 80 and the motor 75 carried thereby to move vertically to vary the position of the belt with respect to the axis of the opposed drums of the Reeves gearing 76.

The detail construction of the clutch 79 is best shown in Figure 5 from which it will be noted that the pulley 78 is journalled upon a shaft 87. Secured to the hub 88 of the pulley 78 is a cylinder 89 having a diaphragm 90 clamped adjacent its periphery. A piston 91 is mounted for axial movement in the cylinder 89 and for rotation therewith. A hub or collar 92 is rigidly secured to the shaft 87, which hub has a fiber disc 93 fastened thereto. The outer circumference of the disc 93 is positioned between the hub 88 of the pulley 78 and the inner face 94 of the cylinder 91.

When air under pressure is admitted to the clutch behind the diaphragm 90 through an air conduit 95, the diaphragm will move inwardly and will force the piston 91 in that direction to clamp the fiber clutch plate 93 between its face 94 and the hub 88 of the pulley. Thus a driving connection is established from the hub 88 and piston 91 through the clutch plate 93, to shaft 87, to drive the latter. The arrangement whereby the air pressure to clutch 79 is controlled will be subsequently described.

Figure 2:
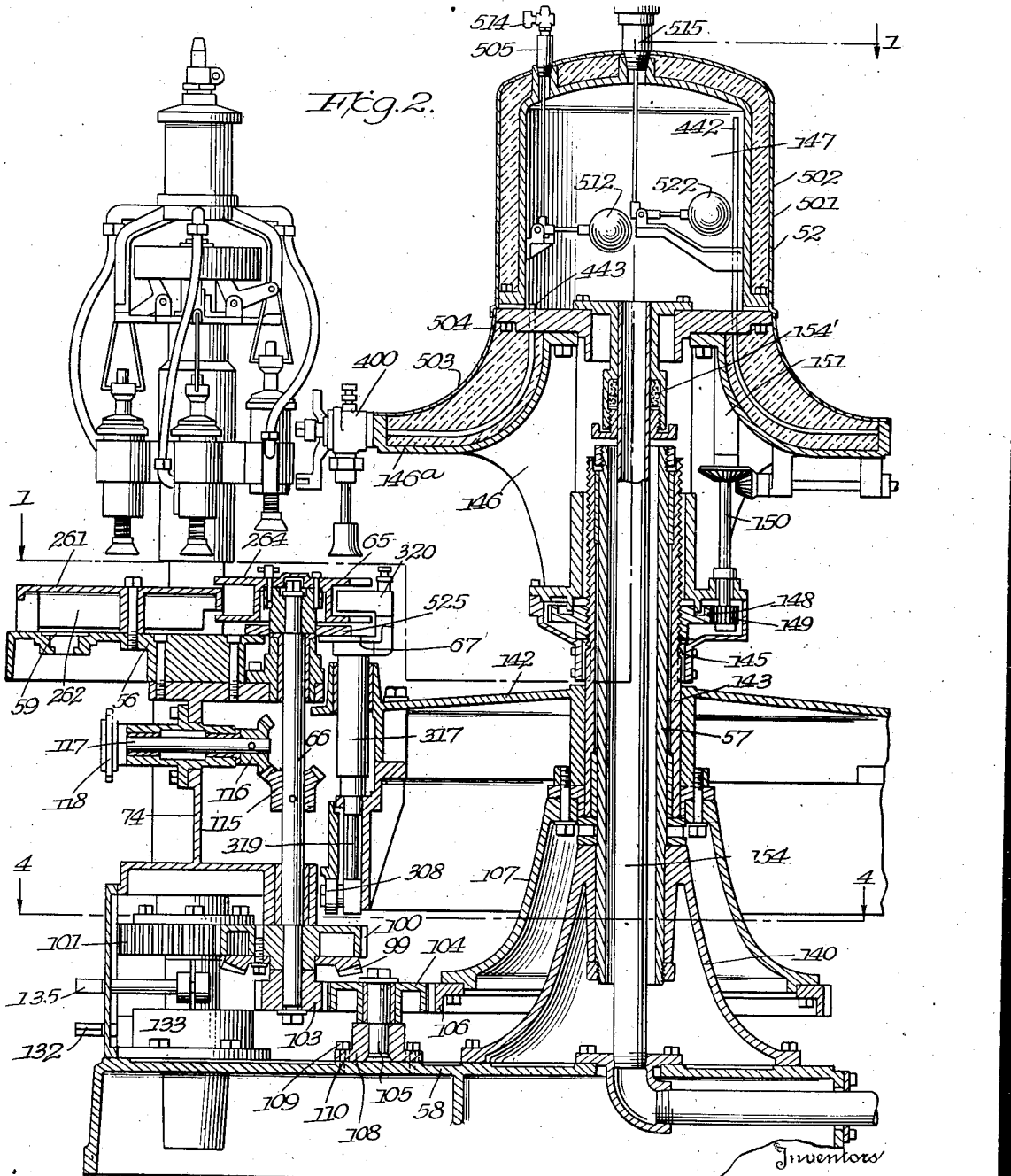
Figure 2 is a vertical sectional view taken on the line 2—2 of Figure 1.
Figure 3:
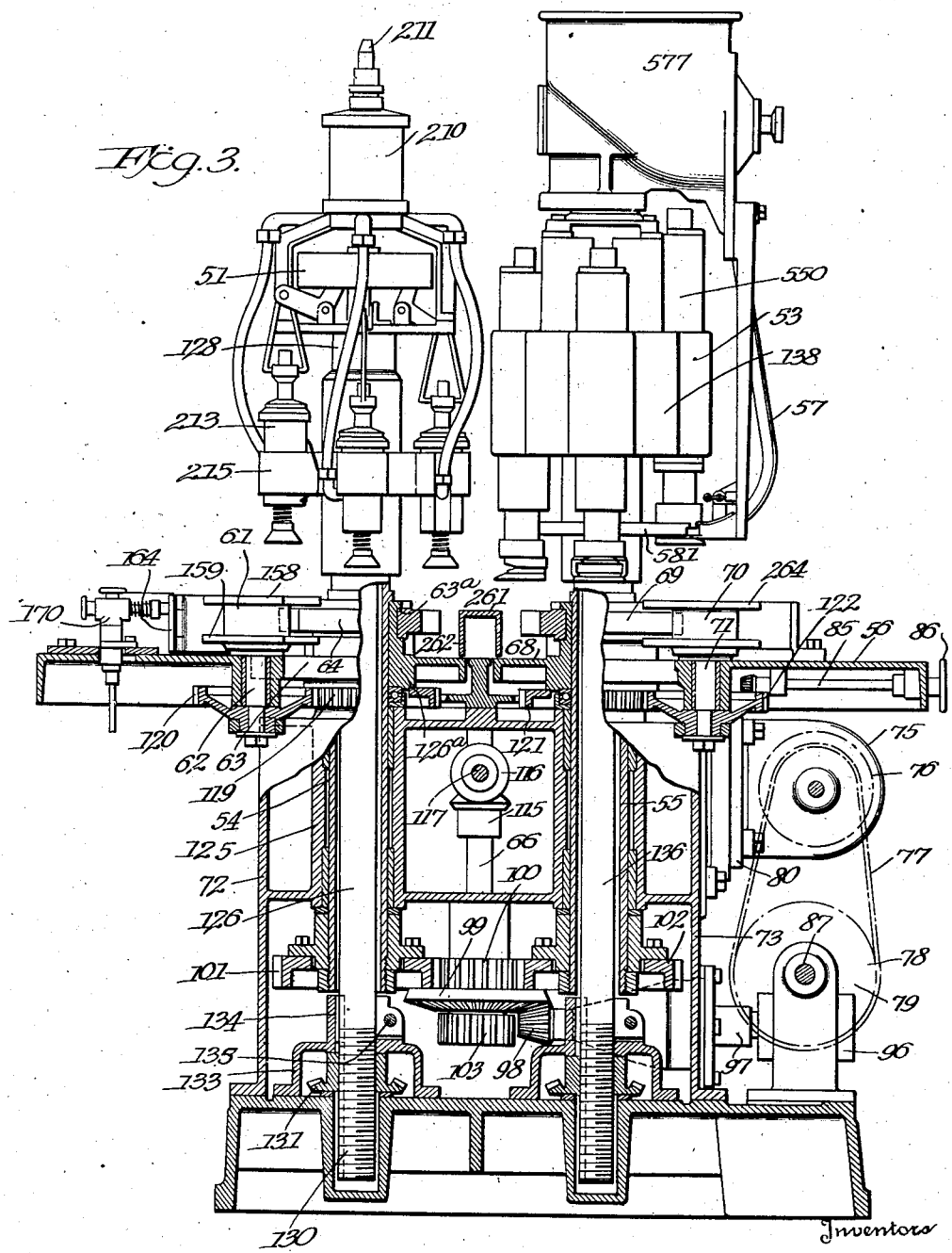
Figure 3 is a front elevation, with portions of the base of the machine broken away to more clearly show the driving mechanism.
Figure 4:
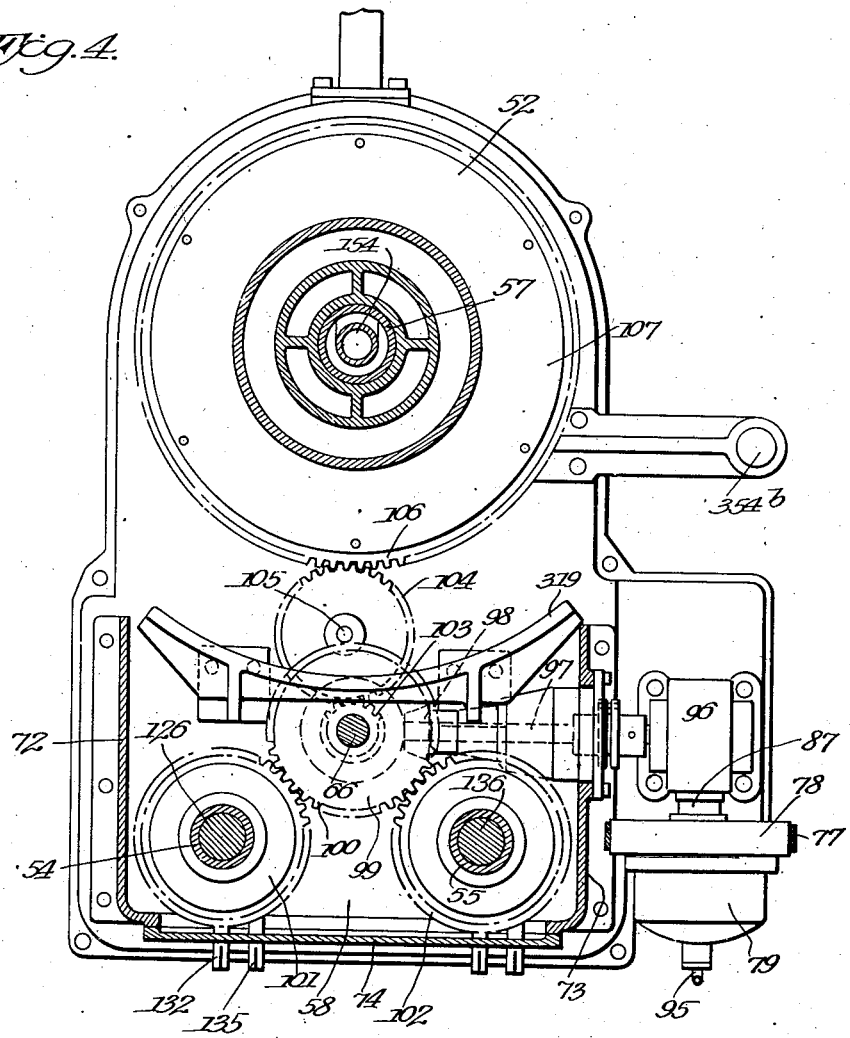
Figure 4 is a horizontal sectional view through the base of the machine, taken on the line 4—4 of Figure 2.

The driving gear connections between the elements of the machine are best shown in Figures 2, 3 and 4, from which it will be noted that shaft 87, through a worm reduction unit 96, drives a horizontal shaft 97 extending at right angles to shaft 87 and through the side wall 73 of the supporting structure. Shaft 97 is suitably journalled in the supporting structure and has a beveled gear 98 fixed to its inner end. Gear 98 drives a ring gear 99 fixed to the central transfer shaft 66. A pinion 100 is secured to the transfer shaft 66 above the ring gear 99 and meshes with pinions 101 and 102, respectively fixed to the shafts 54 and 55 of the syruping and crowning mechanisms 51 and 53. A second pinion 103 is fixed to the transfer shaft 66 beneath the ring gear 99 and meshes with an idler pinion 104 rotatably mounted upon a stub shaft 105. The idler pinion 104 meshes with a large pinion or ring gear 106 secured to a skirt 107 which extends down from, and forms part of, the rotating filling mechanism.

The stub shaft 105 is fixed in a bracket 108 which is held to the base 58 by bolts 109. The pitch diameter of the idler pinion 104 is greater than the distance between the pitch diameter of the pinion 103 and the pitch diameter of the filling mechanism pinion 106, and the stub shaft 105 is offset with respect to the center line passing through the pinion 103 and pinion 106 to compensate for this factor. The idler gear 104 is offset on that side of the center line which results in a tendency to permit the driving force to balance, thus taking a substantial amount of the load from the idler pinion bearing. The holes 110 in the bracket 108 through which the bolts 109 extend are slightly oversize with respect to the bolts, and the entire bracket, carrying the pinion 104, may thereby be shifted inwardly or outwardly with respect to the center line through the pinions 103 and 106 and to the proper adjustment with respect to these pinions. It is obvious that wear between the pinions may be readily compensated for by the above arrangement.

The transfer shaft 66 has fixed thereto, intermediate its ends, a bevel gear 115 which meshes with a bevel gear 116 fixed to a shaft 117 journalled in the front wall 74 of the supporting structure. A sprocket gear 118 is fixed to the outer end of the shaft 117 and drives a sprocket chain, not shown, which, in turn, drives the endless straight line conveyor 59. A pinion 119 is fixed to the syruping mechanism shaft 54 and meshes with a pinion 120 secured to the infeed spider shaft 62. The crowning mechanism shaft 55 likewise carries a pinion indicated by the numeral 121, which meshes with a pinion 122 fixed to the outfeed spider shaft 71.

The means for vertically adjusting the syruping, filling, and crowning mechanisms The syruping mechanism 51, filling mechanism 52 and crowning mechanism 53 are each arranged so that the operating head supporting structures of this mechanisms may be vertically adjusted to enable the mechanisms to operate upon runs of bottles of different heights. Referring to Figure 3, the shaft 54 of the syruping mechanism is journalled in a tubular portion 125 of the supporting structure of the machine, the weight of the syruping mechanism being primarily supported upon an anti-friction race positioned beneath the rotating table 63 and resting upon the upper end of the tubular portion 125. A post 126 is mounted within the hollow shaft 54 and, as shown in Figure 6, an anti-friction race 127 is positioned near the upper end of the post 126 upon which the rotating tubular supporting structure 128 which carries the syruping heads is supported. The supporting structure 128 is slidably keyed at 129 to the rotating hollow shaft 54. By this arrangement, the hollow shaft 54 may be rotated with respect to post 126 and will rotate the supporting structure 128 with it.

The lower end of the post 126 is threaded as shown at 130 in Figure 3 and a bevel ring gear 131 having a threaded bore is positioned about the threaded portion of the post and rests upon a suitable bearing on the base 58 of the machine. A bevel pinion carried at the inner end of a stub shaft 132 journalled in a housing 133 and in the front wall 74 of the machine, meshes with the ring gear 131. The post 126 is keyed to the housing 133 at 134 so that rotation of the stub shaft 132 by means of a crank handle will cause the post 126 to be either raised or lowered to vary the vertical position of the supporting structure 128 and the syruping mechanism heads carried thereby. The upper portion of the housing 133 is longitudinally split and also partially circumferentially split and a stub shaft 135 having a threaded inner end engages aligned threaded bores in the adjacent ends of the split portion. The stub shaft 135 also extends through the front wall 74 of the supporting structure of the machine and may be rotated to tighten the split portion of the housing 133 about the post 126 after the post has been moved to the desired position.

The hollow rotatable shaft 55 of the crowning mechanism is supported in a manner identical with that of the hollow shaft 54 of the syruping mechanism and a post 136 is positioned within the hollow shaft 55. It will be understood that by this arrangement, rotation of the hollow shaft 55 will rotate the supporting structure 138 (Fig. 12) of the crowning mechanism upon bearings 137 at the upper end of the post 136, the supporting structure being slidably keyed to shaft 155 at 139. As is shown in Fig. 3, the post 136 is likewise threaded at its lower end for engagement by the threaded bore of a bevel ring gear. The ring gear is engaged by a bevel gear on an adjusting stub shaft and the post 136 may also be locked in adjusting position, all by an arrangement identical with that provided at the lower end of the post 126 of the syruping mechanism.

The filling mechanism 52 is supported upon a casting 140 (Figure 2) fixed to the base 58 of the machine and to which is fixed the vertical column 57. The skirt 107 which carries the driving ring gear 106 of the filling mechanism is fixed at its upper end to the rotating table 142 of the filling mechanism, which table carries the bottle supporting platform 67. The skirt 107 and table 142 are fixed to a hollow shaft 143 rotatably journalled upon the column 57. A tubular supporting member 144 is mounted upon the hollow shaft 143 above the upper surface of the rotary table 142, the member 144 being keyed to the hollow shaft 143 at 145 for vertical slidable movement with respect to the hollow shaft. Spaced webs 146 project upwardly from the tubular member 144 and support the reservoir 147 and a bell-shaped skirt 146ᵃ to which the filling heads are fixed. A pinion 148 is mounted in and supports the tubular member 144 and has a threaded bore engaging the threaded upper portion of the hollow shaft 143. A small pinion 149 carried on a vertical shaft 150 journalled in the tubular member 144 and in a hollow post 151 projecting downwardly from the filling reservoir supporting structure, meshes with the pinion 148. Shaft 150 is provided with a bevel gear which is engaged by a bevel gear fixed to a shaft 152 journalled in brackets on the underside of the skirt 146ᵃ which extends downwardly from the filling reservoir 147. The shaft 152 may be rotated by a removable crank and its rotation will turn shaft 150 and the small pinion 149 to rotate the pinion 148 upon the hollow shaft 143. Movement of the pinion 148 upon the shaft 143 will cause raising or lowering of the tubular member 144, thereby varying the vertical position of the filling reservoir and the filling heads associated therewith.

A charged water supply pipe 154 extends through the base 58 of the machine and upwardly through the column 57 to the filling reservoir 147. A packed slip joint 154' is provided between the lower wall of the reservoir and the pipe 154, so that the reservoir may rotate relatively to the pipe and may be adjusted vertically with respect thereto

*The means to guide and prevent jamming of incoming bottles*

Bottles are guided in their movement from the straight line conveyor 59 to the infeed spider 61 by means of a guide member 155 positioned on the worktable 56 at the outer side of the straight line conveyor and also by a guiding device generally indicated by the numeral 156 positioned on the inner side of the straight line conveyor and extending opposite the infeed spider 61 throughout the path of movement of the bottles about the spider. The outer guide member 155 is curved at its inner end, as shown at 157, to direct the bottles inwardly toward the spider and upon the worktable, this end of the guide being reduced in vertical cross-section, so that it may project between the upper and lower spaced flanges 158 and 159 of the spider 61. The flanges of the spider are provided with pockets 160 to engage the bottles fed thereto by the straight line conveyor. In order to permit the machine to operate upon bottles of various sizes, the outer guide member 155 is mounted for adjustment, having a flange 161 adjustable on the worktable.

The spider 61 is preferably removably mounted on the shaft 62 by the arrangement shown in Figures 15 and 16. Shaft 62 has a sleeve 62ᵃ keyed thereto above the worktable 56 and the spider is held to this sleeve by two pins 158ᵃ and 159ᵃ. Pin 158ᵃ is secured to sleeve 62ᵃ by a pin 160ᵃ and has an enlarged head. Pin 159ᵃ is removable from the sleeve and spider. When the spider is to be removed from the shaft 62 and sleeve 62ᵃ, a pin 159ᵃ is withdrawn and the spider slightly turned to align the head of pin 158ᵃ with the enlarged portion of the bayonet slot 162ᵃ in the spider and the spider may then be lifted from the shaft. By this construction, spiders for runs of bottles of different sizes may be placed on the shaft 62.

The inner guide member 156 includes a base plate 162 adjustably secured to the worktable 56 by means of bolts extending through slots in the plate and threaded into the surface of the worktable, as shown. The plate 162 has a vertical flange 163 thereon extending along the inner side of the conveyor 59. An angled vertical plate 164 is pivotally mounted upon the plate 162 at 165, the angled plate 164 being normally held in the position shown in Fig. 1 by means of a coil spring 166 surrounding a stud secured to the plate 164 adjacent its pivot point, the inner end of the spring bearing against the rear surface of the angled plate and its outer end bearing upon the inner surface of a bracket 167 fixed with respect to the base plate 162. The stud is slidable through the bracket 167 and may be provided with lock nuts to normally hold the angled plate 164 in proper position. The free end of the angled plate 164 overlaps the adjacent end of the upstanding flange 163 of the base plate 162, so that the angled plate will be held in proper inward position with respect to the spider 61 and straight line conveyor 59. The inner guiding element 156 also includes a curved guide plate 168 surrounding the inner portion of the path of travel of the bottles about the spider, plate 168 including a horizontal angled portion resting upon the worktable 56 and held thereto by bolts extending through slots in the horizontal portion.

Means is provided in connection with the inner guiding element 156 for preventing jamming of the receptacles being fed from the straight-line conveyor 59 to the spider 61, these means being so arranged that the machine will be stopped whenever a jam occurs. This means comprises a fluid pressure control valve for the fluid pressure controlled clutch 79, the valve being generally indicated by the numeral 170 and extending upwardly through an aperture in the plate 162 and fixed in the worktable 56. The valve 170 includes an abutment or latch bolt 170', the outer end or head 171 of which contacts with a lug or shoulder 172 on the rear surface of the angled plate 164 adjacent the pivot 165 thereof.

The detailed structure of the control valve 170 is illustrated in Figure 5 and, referring to this figure, it will be noted that the valve comprises a cylinder or casing 173 which is adapted to be secured to the worktable and provided with an internal annular shoulder 174 intermediate its ends. The shoulder 174 is provided on the opposite faces thereof with valve seats 175 and 176. Air is supplied to the controlling valve 170 through a pipe line 177 from a tank 178 to which the air is forced through a pipe 179 from a compressor 180 driven by a small motor 181. A pressure reducing valve 182 and a pressure gauge 183 are included in the line 177. The line 177 is connected to the cylinder 173 through an inlet cap 184 threaded into the lower end of the cylinder 173. A relatively strong compression spring 185 is seated in an internal enlargement in the cap 184, the upper end of the spring contacting with a cut-off valve 186 on one end of a valve stem 187 to constantly tend to move the same upwardly to closed position on the seat 175. When the machine is in operation and no jamming of bottles occurs opposite the angle plate 164, air flows through the pipe line 177 into the internal enlargement of the cap 184, upwardly past the valve 186 and out of a lateral outlet port 188 through a conduit 189 to the inlet 190 of a second pressure controlling valve generally indicated by the numeral 191, which is positioned (Fig. 1) adjacent the outfeed spider 70 of the machine to control jamming of bottles at that point. The internal construction of the valve 191 is identical with that of valve 170 and pressure entering valve 191 through inlet port 190 will normally move through the valve and out of the outlet 192 thereof in the same manner that the pressure entering the valve 170 through inlet 184 will normally flow through the latter valve and outwardly through outlet port 188. The pressure passing from the outlet 192 of valve 191 will move through the line 95 to the driving clutch 79 of the machine. Such pressure will act upon the diaphragm 90 of the clutch to hold the cylinder 91 thereof and the friction disc 93 against the hub 88 of the pulley 78, causing the machine to be driven from the motor 75.

Referring again to the structure of the controlling valve 170, a second valve 193 is carried on the valve stem 187 at the inner end thereof and this valve is adapted to be seated upon the valve seat 176 when the valve 186 is open and the machine normally operating as described above. When the valve stem 187 which carries both valves, moves upwardly, the valve 186 will be closed and the flow of compressed air cut off. At the same time, the valve 193 will be lifted from its seat 176 and the air under pressure in the clutch will be permitted to flow backwardly through the conduit 95, controlling valve 191, conduit 189, into the cylinder 173, and past valve 193 to exhaust to atmosphere through a laterally opening exhaust port 194. This will release the pressure against the diaphragm 90 on the clutch so that the piston 91 and friction disc 94 will be moved to disengaging position by the springs 92' spaced about its inner face. The machine will thus be stopped until the jam can be corrected.

The means whereby the valve 170 is moved to the exhaust position just described is as follows: A cylinder head fitting 195 is secured in the upper end of the cylinder 173, the fitting 195 being provided with a transverse bore 196 and a vertical bore 197, the upper end of the valve stem 187 extending into the latter bore. The upper end of the valve stem 187 is of tubular form, and the lower end of an operating handle 198 is seated in the socket thus formed. A compression spring is disposed in this socket beneath the lower end of the handle 198. A transverse bore 199 extends through the upper end of the handle 198 and the abutment or latch bolt 170' is fitted in the transverse bore 196 of the fitting 195 and through the bore 199. Latch bolt 170' is provided intermediate its ends and on its lower side with a notched recess 200 and a shoulder 201. The headed end 171 of the bolt 170' is provided with a socket 202 in which is seated a coil spring 203, the outer end of the coil spring bearing against head 171. Head 171 includes a shoulder 204 and an inturned flange 205, the latter at its inner end to contact with an enlargement 206 on the bolt. A coil spring 207 has one end bearing against the shoulder 204 and the opposite end bearing against the fitting 195, this spring serving to hold the head in the position shown. The coil spring 203 permits a bottle to strike against and slightly deflect the angled plate 164 without actuating the valves 186 and 193.

When the machine is operating in a normal manner, the shoulder 201 is engaged in the opening or bore 199 of the operating handle 198. When the latch bolt 170' is moved rearwardly by reason of pressure exerted thereagainst by the abutment 172 on the angle plate 164, either by reason of a jam of bottles occurring between the angled plate and the spider 61 or by a manual pull applied to the handle 208 of the bolt, the shoulder 201 will be moved out of contact with the operating handle 198 and the valve stem 187 will snap upwardly under the action of the spring 185. The valve 186 is thus closed and the valve 193 opened to stop the machine, as previously described.

When it is desired to again start the machine, it is only necessary to manually depress the actuating handle 198, which, through the spring within the socket of the valve stem 187, will tightly close the valve 193 before the shoulder 201 of the bolt snaps back into latching position. When the handle 198 has been sufficiently depressed, the bolt 170' will automatically assume latching position under the action of the spring 207.

In the event that a jam should occur opposite the pressure control valve 191 positioned adjacent the outfeed spider 70, the latter valve will be actuated in the same manner as that just described in connection with valve 170. Actuation of valve 191 either due to a jam of bottles or by manual operation, will release the pressure in the line 95 to cause the clutch 89 to move to disengaged position. However, pressure will remain in the line 177 and pressure controlling valve 170, as well as in line 189, between valve 170 and valve 191, so that when the valve 191 is restored to normal position, the pressure circuit to the clutch will immediately become effective.

The syrup is supplied to the syruping mechanism 51 of the machine from a syrup storage tank, not shown, and located above the machine so that the syrup will flow therefrom by gravity. As indicated in Figure 3, the syrup enters the reservoir 210 of the machine by a pipe line 211 leading from the storage tank. Syrup flows to each syruping head 213 and thence to each bottle moving with the syruping spider 64 by the mechanism described in detail in our divisional application Serial No. 6,720, Filling head, filed February 15, 1935.

As the bottle moves about the syruping mechanism 51, it will be filled with the proper amount of syrup. The syruping operation will be completed and the camway 226 fixed to post 126 will cause the bell crank cam member 218 which is provided to support each syruping head to move the corresponding syruping head to elevate the centering bell 257 clear of the mouth of the bottle immediately prior to the movement of the bottle into one of the pockets 260 of the transfer spider 65 by the rotation of the syruping spider 64.

The spider 64 of the syruping mechanism is preferably diametrically split into two halves, which halves are held together and in a circumferential groove 63ª on a sleeve 126ª keyed to the shaft 126 (as shown in Figure 3) by vertical pins extending through apertures in circumferential flanges on the sleeve and through apertures in the spider halves. By this arrangement, spiders for bottles of different sizes may be fitted upon the syruping mechanism. The spider 69 of the crowning mechanism is formed in the same manner.

The bottles will be held properly positioned upon the syruping table 63 and in the pockets 64ª of the syruping spider by a central guide element 261 which is provided with downwardly extending walls 262 of sufficient height to prevent the bottles from falling over or moving from the rotating syruping table. As is shown in Figure 1, the central guide member 261 includes an extension 263 which projects between the spaced plates 158 and 159 of the infeed spider 61 so that the bottles will be properly moved from the latter spider by the syruping spider. The inner end of the guide member 261 extends between the spaced plates 264 of the transfer spider 65 to properly guide the bottles from the syruping spider to the transfer spider. As is indicated in Figure 1, the spaced plates 264 of the spider 65 are spaced above and below the spider 64 of the syruping mechanism so that the two spiders may interengage about a bottle.

The transfer spider 65 is formed and secured to its shaft 66 in the manner already described in connection with the infeed spider 61, this permitting the use of spiders of various sizes upon the transfer shaft 66.

A guide member shown in Figure 1 is provided to properly direct the movement of bottles about the left hand side of the transfer spider 65 from the syruping mechanism to a bottle supporting platform 67 of the filling mechanism. This guiding mechanism comprises a plate 265 secured to the worktable 56 by bolts threaded into the worktable and extending through slots in the plate to permit adjustment of the latter for runs of bottles of various sizes. A curved upstanding guide element 266 extends across the surface of the table 63 of the syruping mechanism, this element being bifurcated so that it extends above and below the syruping spider 64. A movable guide plate 267 is pivoted to the guide element 266. The curved and movable guide plate 267 is normally held in position to properly guide the course of bottles from the pockets 260 of the transfer spider 65 to the bottle supporting platforms 67 by a coil spring 268 about a bolt pivoted to the rear surface of the movable plate 267, one end of the spring bearing against the movable plate and the other end contacting with an upstanding bracket on the horizontal and fixed plate 265. Lock nuts may be provided upon the bolt to limit inward movement of the movable plate.

*The filling mechanism bottle platforms*

A plurality of bottle supporting platforms 67 are reciprocably mounted in the rotary table 142 of the filling mechanism 52. As shown in Figures 7, 8 and 9, each bottle platform is secured by a machine screw or the like 301 to a rod 302 which is provided with a threaded portion 303 at its lower end which threadedly engages a bore 304 in a slide block 305. The slide block is movable between slideways 306 extending outwardly from a skirt 307 secured to the lower outer edge of the table 142. A roller 308 is rotatably mounted upon a stud 309 threaded in a horizontal bore in the block 305. A coil spring 310 is mounted about the rod 302, the upper end of the coil spring bearing upon a collar 311 welded to the upper end of the rod 302 beneath the surface of the bottle platform 67. The rod 302 is held against rotation by means of a pin 312 extending from the bottle platform into a cutout portion in the collar 311. The lower end of the spring 310 bears upon a collar 313 mounted upon the rod 302 and provided with a shoulder which engages a shoulder 314 on the outer surface of the skirt 307 of the table 142. The table 142 is provided with an upstanding boss 315 through which the rod 302 extends in a vertical bore 316 provided through the boss. Telescoping tubes 317 and 318, respectively, are secured to the underside of the bottle platform 67 and the lower collar 313 to enclose the spring 310 and guide the reciprocating movement of the bottle platform 67. A bushing may be provided in the bore 316 as shown in Figure 7.

During the greater part of the rotation of the filling mechanism, the bottle platforms 67 are in their upward position due to the expansion of the spring 310. A platform is only in the lowered position shown in Figure 7 when the platform is adjacent the worktable 56, at which time, as illustrated in this figure, the roller 308 on a bottle supporting platform will contact with a cam shoulder 319 secured to the supports of the worktable so that the surface of the bottle supporting platform 67 will be flush with the level of the worktable 56 to permit bottles to be moved from the worktable to the platform and vice versa by the transfer spider 65.

Each bottle platform 67 is provided with a bottle engaging member 320, which is removably supported upon an upstanding shoulder 321 on the inner side of the bottle support. The member 320 is provided with arms 322 and 323 which, together, are curved to conform to the circumference of the body of the bottle. The arm 323 is preferably somewhat longer than the arm 322, as shown in Figure 8, the arm 323 being the arm at the rear of the bottle with respect to the course of movement thereof. The bottle engaging member 320 is provided with an aperture 324, which fits upon a fixed pin 325 projecting upwardly from the shoulder 321 of the bottle support at one side thereof and a second pin 326 extending upwardly from the other side of the shoulder 321 is adapted to be positioned at the inner end of an arcuate slot 327 opening to the rear face of the member 320. The pin 326 is provided at its upper end with a sleeve 328 normally held downwardly by a spring 329 and in a relatively shallow counter-bore in the upper surface of the member 320 which counter-bore is aligned with the inner end of the slot 327, as shown in Figure 7. The upper end of the spring 329 bears against a head 330 on the extreme upper end of the pin 326. By the above arrangement, the bottle engaging member 320 is held in proper position on the bottle platform 67 by engagement of the cap 329 in the counter-bore. When it is desired to remove the member 320 to substitute a bottle engaging member of a different size therefor, it is only necessary to raise the cap 328 and swing the member 320 inwardly on the pin 325 to clear the cap 328, after which the member 320 may be raised from the pin 325.

The filling trips

In the normal operation of the machine, as a bottle supporting platform 67 carried by the rotating filling mechanism approaches the worktable 56 from the right (Figure 1), the roller 308 included in the bottle supporting platform structure will contact with the fixed cam shoulder 319 projecting downwardly from the inner edge of the worktable. Contact of the roller 308 with the cam causes the bottle supporting platform to be drawn downwardly so that the upper surface of the bottle supporting platform is flush with the upper surface of the worktable. If a filled bottle is on the platform, the transfer spider 65 will remove that bottle as hereinafter described and will position a syruped bottle upon the platform and the bottle will be moved in a counterclockwise direction toward a counterpressure trip 352 supported above the worktable and hereinafter referred to in detail. The cam 319 is of such configuration that almost immediately after the syrupted bottle has been received upon the platform 67, the roller 308 will move clear of the cam, permitting the bottle supporting platform 67 to rise by reason of the expansion of the coil spring 310 included in the bottle supporting platform structure.

The filling mechanism 52 is provided with twenty-four filling heads 400, those illustrated in Figures 1 and 2 being of the rotary type described and claimed in our original application for Filling machines, Serial No. 671,266, filed May 15, 1933.

The filling reservoir

As has been previously explained, the filling reservoir 147 of the filling mechanism 52 is rotatably mounted at the upper end of the column 57 which supports the filling mechanism. The reservoir is illustrated in detail in Figure 10, from which it will be observed that an insulated covering 501 within an outer casing 502 encloses the reservoir. Water tubes 443 extend from the lower portion of the reservoir 147 to each of the filling heads indicated at 400 and counter-pressure or vent tubes 442 extend through the bottom wall of the reservoir to a point near the upper portion of the reservoir, one of the tubes 442 also being provided for each of the filling heads 400. Only one set of these tubes is illustrated in Figure 10. As is shown in Figure 2, the tubes 442 and 443 are enclosed within a body of insulating material designated by the numeral 503 and positioned between the supporting skirt 146a of the reservoir and a cover 504.

As is shown in Figure 2, and as been described, the column 57 upon which the filling reservoir 147 is mounted encloses and rotates about an upright pipe 154 through which carbonated filling water is supplied to the reservoir. Pipe 154 extends beneath the base 58 to a carbonator of any desired type.

The filling reservoir of our preferred construction is so designed that it is unnecessary to provide an inlet valve for the incoming water from the supply pipe 154, the flow of filling water into the reservoir being controlled by the valve arrangement described below.

An air or pressure escape fitting 505 is provided in the upper wall of the reservoir 147, flow of air or gas through this fitting being controlled by a valve 506 fixed to the upper end of a valve rod 507 pivotally connected to a float arm 508 at 509. The float arm 508 is pivoted at 510 to a bracket 511 near the bottom wall of the reservoir and carries a float 512 at its free end. When the float is in raised position, as shown in Figure 10, the valve 506 is held against a seat 513 in the fitting 505. A manually operated plug valve 514 is provided upon the fittings 505 to permit flow through the fitting to be regulated when desired. However, the manual valve 514 is open during the normal operation of the apparatus.

A gas inlet valve fitting 515 is also provided in the upper wall of the reservoir 147, this fitting being provided with a valve 516 carried at the upper end of a rod 517 pivoted at 518 to a float arm 519, which float arm is pivoted at 520 to a bracket 521, fixed to the inner wall of the reservoir. The free end of the float arm 519 carries a float 522 (Figure 2). As is shown in Figures 2 and 10, the float 522 which controls the gas inlet is normally positioned slightly above the float 512 which controls the escape of air and gas. The gas inlet valve fitting 515 is connected by a pipe 523 to a source of gas such as carbon dioxide.

In order to fill the filling reservoir 147, the valves 403 of the filling heads 400, for example, are moved to snifting position and a valve, not shown, in the gas supply pipe 523 is opened to supply gas to the reservoir 147 until the latter is filled to the desired gas pressure to be maintained in the reservoir during the operation of the machine. The valve 516 will open against the weight of the float 522 to permit this gas to move into the tank, valve 514 being closed. The valve in the pipe 523 is then closed and valve 516 will move to closed position by the weight of float 522. Water is then permitted to flow in from the carbonator through the water line 154, the manual valve 514 in the gas vent fitting 505 being opened very slightly to the atmosphere to permit gas in the tank 147 to be vented to permit the entrance of the water. When the level of the water in the reservoir 147 reaches a level at which it will move the float 512 upwardly, it will close the gas vent valve 506 to the atmosphere. The manually operated gas vent valve 514 may now be entirely opened but the vent through the fitting 505 will of course be kept closed by the action of the float 512 and valve 506.

In the operation of the filling valves, for example, those indicated at 400, and as has been described, both filling water and gas are constantly withdrawn from the filling reservoir 147, the charged water flowing outwardly through the pipes 443 and the gas flowing outwardly through the pipes 442. However, the gas withdrawn through the pipe 442 will be replaced to some extent by the air and gas which is vented from the bottles during the filling cycle in the manner already described.

The apparatus is particularly designed to maintain a proper level of water in the reservoir with a substantially uniform body of gas at a uniform pressure above the body of water. Some air will of course be mixed with gas above the level of the water, due to the fact that a varying amount of air is vented from the bottles during the filling cycle. Because of the fact that practically all of the gas which flows from the upper portion of the reservoir to the bottles is returned to the tank, plus some air, while the water is continually being drained from the reservoir, the level of the water will tend to become lower. However, when the level of the water drops to such an extent that the float 512 is lowered, the air escape valve 506 will open, permitting the pressure of the gas and air to be relieved and thereby enabling additional charged water to flow into the tank through the pipe 154.

If a bottle should be broken during the very short interval of time during which counter-pressure is being established in a bottle, the escape of any substantial volume of gas from the upper portion of the reservoir will be prevented by the float 522. This float is arranged to open the gas inlet valve 516 when the float rises and should gas escape from the reservoir, permitting the level of the water to rise to lift the float 522, valve 516 will be opened, permitting additional gas to flow into the tank. The incoming gas, under pressure, will prevent further rise of the water and will, in fact, force the level of the water downwardly to permit the float 522 to be lowered, thereby closing the gas inlet valve 516.

It will be observed that, from the above arrangement, the level of the water will be held at a point between the floats 512 and 522.

*Reciprocable or poppet valve type filling head*

Figures 17 to 24, inclusive, illustrate a filling head adapted to be used in place of the filling heads of the type indicated by the numeral 400 in Figures 1 and 2. The filling head of Figures 17 to 24 is provided with reciprocable or poppet type valves. As has been previously stated, the rotary filling heads of the type indicated at 400 are described in our original application Serial No. 671,266.

Referring to Figure 17, the numeral 700 generally designates the filling head, which includes a body portion 701 and a rotary cam plate 702 preferably concentric with a filling nozzle 703 having a centering bell 704 slidably mounted thereon.

The valve body 701 of the filling head 700 is adapted to be secured to the portion of a rotary filling mechanism corresponding to the skirt 146ᵃ of the filling mechanism of Figure 2 by means of bolts or the like extending through a flange 701ᵃ on the rear or inner side of the body 701. Tubes or pipes respectively similar to the gas and vent pipe 442 and water pipe 443 of Figure 2, would be connected to the rear or inner side of the head.

The valve body 701 includes a central downwardly projecting boss 705. A collar 706 is secured against the lower end of the boss 705 by means of a sleeve 707 having a lower inwardly projecting shoulder 708, which engages beneath the shoulder on the collar 706. A washer or packing is interposed between the upper surface of the collar and the lower surface of the boss. A filling tube 709 included in the filling nozzle 702 extends through the collar 706 and into the lower end of the body 701, the extreme upper end of the tube 709 being provided with a shoulder which bears upon the upper surface of the collar 706. A sleeve 710 surrounding the filling tube 709 of the filling nozzle extends up into a counter-bore in the collar 706 and is there surrounded by a packing washer 711. The sleeve 710 is held in position about the tube 709 by means of a conically shaped member 712 screw threaded upon the lower end of the filling tube 709, as shown in Figure 17.

A packing ring 713 is fitted in the lower surface of the collar 706 and projects downwardly past the lower surface of the collar in order that the joint between the upper surface of the centering bell 704 and the collar may be tightly sealed when the centering bell is pressed against the collar by a bottle, as hereinafter set forth.

Figure 21:
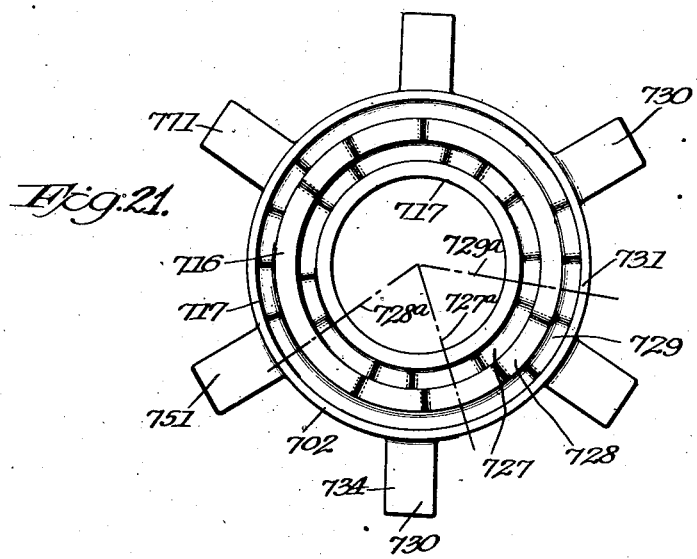
Figure 21 is a plan view of the cam plate used in the filling head of Figure 17.

The cam plate 702 is positioned about the lower portion of the valve body 701 and surrounds the boss 705 and collar 706, the cam plate having the general outline of a ring, as best shown in Figure 21. A collar 714, surrounding the sleeve 707, is threaded into a downwardly projecting flange 715 on the cam plate 702, the lower end of the flange contacting with a shoulder on the collar, as shown. The cam plate 702 is provided with a plurality of annular cam tracks generally designated by the numeral 716, which are formed in an upwardly projecting shoulder 717, on the cam plate, this shoulder fitting into an annular cut-out portion 718 on the lower surface of the valve body 701 about the boss 705. The cam plate 702 is vertically slidable upon the valve body 701, its upward limit of movement being determined by contact of the upper surface of the shoulder 717 with the upper wall of the annular cut-out 718. The downward limit of movement of the cam plate 702 is determined by a flange 719 projecting from the upper end of the sleeve 707.

A counter-pressure valve 720, a water or filling valve 721 and a snifting valve 722 are positioned in valve chambers 723, 724, and 725, respectively, in the valve body 701, which chambers extend vertically of the valve body. Each of the three valves is provided with a valve stem 726 mounted in a vertical bore extending downwardly through the valve body. The lower ends of the stems normally project down into the cut-out portion 718 of the valve body 701. Packing rings 726ᵃ held in place by collars 726ᵇ which include small coil springs seal the vertical bore against leakage. The vertical center line of the valves and their respective valve stems correspond to the vertical center lines of the respective valve chambers and the vertical center lines of each of the chambers is at a different distance, measured radially, from the vertical center line of the valve body 701.

As is best shown in Figure 19, the center line of the counter-pressure valve 720 and its chamber 723 are most closely adjacent the vertical center line of the valve body, the filling valve 721 and its chamber 724 are next adjacent the center line of the valve body and the snifting valve 722 and its chamber 725 are farthest from the valve body center line. The cam 716 of the rotary cam plate 702 is provided with three cam surfaces illustrated in Figure 21 and bearing the numerals 727, 728 and 729, respectively, each cam surface being annular in a horizontal plane and preferably concentric with the vertical center line of the valve body 701 when the cam plate is mounted thereon. As shown in Figure 21, cam surface 727 is the innermost of the three cam surfaces. Cam surface 727 is also illustrated by dotted circular lines in Figure 19, from which it will be noted that this cam surface is beneath the stem of the counter-pressure valve 720. Cam surface 728 is also shown in Figures 19 and 21, Figure 19 showing the cam surface aligned with the stem of a filling valve 721 while the outer cam surface 729 is shown in Figure 19 as aligned with the snifting valve 722. It will be obvious from this that rotation of the cam plate 702 will cause the respective cam surfaces to coact with the valve stems 726 of the respective valves to operate the latter.

The cam plate 702 is of such diameter that the cam surfaces thereon are sufficiently long to operate each of the respective valves twice during one rotation of the cam plate. That is to say, each cam surface can operate its valve during two full filling cycles of the filling mechanism by one rotation of the cam plate 702.

Figure 22:
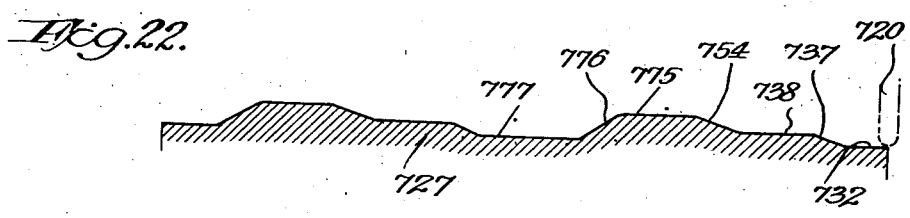
Figure 22 is a development, in vertical plan, of the counter-pressure valve operating cam track of the cam plate shown in Figure 21.
Figure 23:
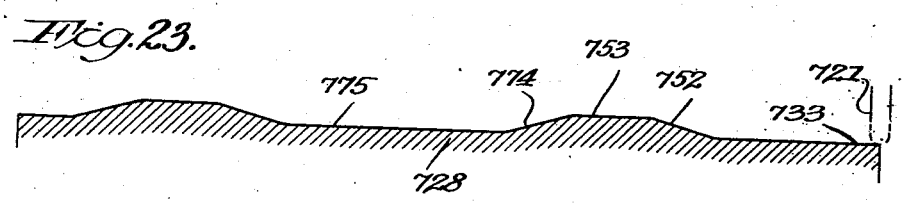
Figure 23 is a development, in vertical plan, of the filling valve operating cam track shown in Figure 21.
Figure 24:
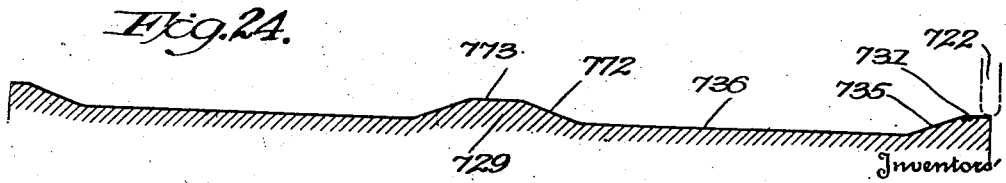
Figure 24 is a development, in vertical plane, of the snifting valve operating cam track shown in Figure 21.

The respective cam surfaces of the cam plate 702 are developed, in a vertical plane, in Figures 22 to 24, inclusive. The development of the counter-pressure cam surface 727 is shown in Figure 22, the right-hand end of the development beginning at the line 727ᵃ on Figure 21, the development continuing about that figure in a clockwise direction. The development of filling valve cam surface 728 is set forth in Figure 23 and the right hand end of the development begins at the line 728ᵃ on Figure 21 and also continues about that figure in a clockwise direction, while in the development of snifting valve cam surface 729 shown in Figure 24, the right hand end of the development begins at the line 729ᵃ in Figure 21 and shows the surface as it continues about the cam plate in a clockwise direction. Since the counter-pressure cam surface 727 is innermost upon the cam plate 702, it is naturally of less circumference than the other two cam surfaces and the outermost cam surface 729 is the longest of the three. This accounts for the differences in the lengths of the developments of Figures 22, 23 and 24.

The cam plate 702 is provided with six radially projecting arms 730 which are equi-distantly spaced about the periphery of the cam plate, as shown in Figure 21. Successive contact of three of these arms with the respective counter-pressure, filling and snifting trips about a rotary filling mechanism similar to that illustrated in the present application will cause the cam plate 702 to be given a step by step turning movement to cause the cam surfaces of the cam plate to properly actuate the valves during the filling cycle represented by one rotation of the filling mechanism 52. The filling head illustrated in Figures 17 to 24, inclusive, when used with the filling mechanism of the present application, would be operated by vertical posts of suitable diameter and vertical height positioned approximately at the points at which the inwardly extending trips 352, 353 and 354 of Figure 1 are positioned. Since the present filling head is adapted to be used with the filling mechanism of the present application, each filling head will have a bottle platform 67 of the type shown in Figure 7 beneath the same.

The arrangement of the various flow passages through the filling head 700 and their manner of control by the respective valves will be more readily understood when taken in connection with the operation of the filling head set forth below:

When a filling head 700 is in a position opposite the transfer spider 65 so that its bottle platform 67 may receive a bottle from the spider, the valves of the filling head will be in the position to which they were moved by the snifting trip during the previous movement of the filling head with the filling mechanism and the valves will therefore be in readiness to be operated upon by the cam surfaces of the cam plate 702 in accordance with the right to left developments of the cams illustrated in Figures 22 to 24, inclusive. The cam plate 702 will be in its downward position and out of contact with the valve stems 726.

When a bottle is placed upon the bottle platform 67, rotation of the filling mechanism with respect to the worktable 56 will cause the cam shoulder 318 (Fig. 7) to permit the roller 308 of the bottle platform to move upwardly and when the roller entirely clears the cam shoulder 319, the spring 310 of the platform will be free to move the platform and the bottle carried thereby up toward the filling head 700. The raising of the bottle will cause its mouth to contact with the inner surface of the centering bell 704 about the filling nozzle 703 and the bottle will push the centering bell upwardly along the nozzle. When the centering bell comes adjacent the collar 706, it will first contact with the lower surface of the collar 714 which is fixed to the cam plate 702, causing the cam plate to be raised to the position shown in Figure 17. In this position, the centering bell 704 will be sealed to the collar 706 by contact with the packing washer 713 and the bottle will be sealed to the centering bell by contact of the mouth of the bottle with a sealing ring 704ᵃ within the centering bell.

The movement of the cam plate 702 to upward position in the manner described above will cause the point 731 (Figures 17, 21 and 24) on cam surface 731 to contact with the valve stem 726 of the snifting valve 722 to lift the latter from its seat, as shown in Figure 17. As will be understood from Figures 22 and 23, the respective stems of the counter-pressure valve 720 and filling valve 721 will be aligned with lower surfaces 732 and 733 respectively on the cam surfaces 727 and 728 so that these valves will not be raised from their seat.

Rotation of the filling mechanism in the usual manner will cause the filling head 700, now being described, to be moved toward a counter-pressure trip comprising an upright post, not shown, which would be positioned at a point coincident with the counter-pressure trip 352 shown in Figure 1. The upright post would be of such height and diameter that the radial arm 734 of cam plate 702 will contact with the same and will be moved in a counter-clockwise direction (Figure 21) to move the respective cam surfaces of the cam plate relatively to the respective valve stems. Referring to the figures in which the cam surfaces are developed, the valve stem of the snifting valve will move from the raised surface 731 of cam 729 down the incline 735 to a low point 736 on that cam, thereby causing the snifting valve to close. The filling valve cam surface 728 will move beneath the stem of the filling valve 721 but will not move sufficiently far to cause its valve stem to leave the low surface 733. The counter-pressure valve cam surface 727 will coact with the stem of that valve to cause it to ride up the incline 737 to the intermediate raised portion 738, thereby slightly raising this valve.

The partial raising of the counter-pressure valve 720 will cause this valve to be lifted from its seat 739 (Figure 18) in the valve chamber 723 against the action of a coil spring 720a the upper end of which bears against a plug 740a which closes the upper end of valve chamber 723. The head of the valve 720 is provided with upwardly inclined circumferentially spaced ports 741 which terminate at the lower end of a vertical port 742. The vertical port 742 opens to the upper face of the valve head within the valve chamber 723.

By the slight upward movement which has been given the valve 720, the valve chamber 723 will be opened for flow of gas therethrough from two horizontal passages 743 and 744, which extend horizontally through the valve body 701. The passage 744 is positioned beneath the passage 743 and is enlarged at its inner end, as shown. A ball check valve 745 is positioned in the enlarged portion of the passage 744. Passages 743 and 744 are both in communication with the gas pipe 442 from the filling tank 147 and gas will flow through passage 743 and by a restricted portion 746 to the upper portion of valve chamber 723, then pass down through the vertical port 742 and through the inclined ports 741 to the lower portion of the chamber.

Gas will also flow through the lower passage 744 to the lower portion of the valve chamber 723, the pressure of the gas being insufficient to cause ball valve 745 to be seated. From the valve chamber 723, the gas will flow downwardly past the seat 739 (as indicated by the arrows of Figure 20) and through an angled passage 747, the lower end of which is aligned with a diagonal passage 748 in the collar 706. The lower end of the passage 748 opens to the extreme upper end of a channel 749 formed in the filling nozzle 703 between the filling tube 709 and the sleeve 710 by flattening one side of the filling tube 709. As shown in Figure 17, the upper end of the sleeve 703 terminates below the lower end of the passage 749 so that this passage will be open to the passage 748, as described. An aperture 750 provided in the sleeve 710 near the lower end thereof is aligned with the passage 749 so that the gas moving down the passage 749 may enter the bottle through the aperture 750.

By the flow circuit described above, a pressure of gas will be established in the bottle equal to that of the body of gas above the filling water in the filling reservoir 147.

Should the bottle beneath the filling head be broken during the step of establishing counter-pressure in the bottle, the cam plate 702 would drop downwardly from engagement with the valve stems of the filling head to its downward position, permitting the counter-pressure valve 720 to close, since bottles usually break during filling in such a manner that the bottle practically collapses. Should the bottle break in this manner, the centering bell would, of course, drop and fail to support the cam plate 702 in its upward position. Even if the bottle should not collapse to thereby permit the cam plate to drop, the counter-pressure step is of such brief duration that no appreciable amount of gas would be lost from the filling reservoir 147.

Continued rotation of the filling mechanism will cause a post-like filling trip, not shown, which would be positioned at 353 in Figure 1, to come in contact with the radial arm 751 of the cam plate 702, the latter arm having been shifted to contacting position by the previous turning of the cam plate by the counter-pressure trip. Contact of arm 751 with the filling trip will cause the cam plate to be rotated so that its cam surfaces will operate the valves of the filling head to the position they occupy during the filling step.

Referring to Figures 22, 23 and 24, it will be seen that the cam surface 729 will move beneath the snifting valve 722 but will not move sufficiently far with respect to this valve to cause its stem to leave the low surface 736. Therefore this valve will not be affected. The cam surface 728 will move beneath the filling valve 721 to such an extent that the stem of the valve will be moved upwardly by the incline 752 to the raised surface 753, thereby opening this valve against the pressure of a coil spring 721a, the upper end of which bears against a rotary plug valve 757, hereinafter described. The cam surface 727 which operates the counter-pressure valve 720 will move sufficiently far beneath the stem of that valve to cause it to be moved upwardly by the incline 754 to the raised surface 755.

The valve chamber 724 of the filling valve 721 is provided with a rotatable plug valve 757 provided with a transverse bore 758 and a vertical bore 759 which extends downwardly from the transverse bore to the lower face of this valve. Plug valve 757 is mounted for rotation in a valve fitting 760 having an annular groove 761 thereabout and ports 762 in the plane of the horizontal port 758 of the plug valve 757. The valve fitting is also provided with a vertical port 763 which is in alignment with the vertical port 759 of the plug valve. Packing 764 is provided above the upper face of the valve 757 in the valve fitting 760, the packing being held compressed by a threaded sleeve 765. A knurled handle 766 is provided upon the upper end of the valve 757 to permit the same to be turned to any desired position with respect to the valve fitting 760.

The action of the cam surface 728 in raising the filling valve 721 to open position from its seat 752 in valve chamber 724 will permit charged water to flow through the water pipe 443 into a passage 768 (Figures 19 and 20) which extends horizontally through the valve body 701 to the extreme upper portion of the valve chamber 724.

The water will flow through the ports in the plug valve 757 and downwardly through the chamber and past the valve seat 752 as indicated by the arrows in Figure 20 and into an angled passage 769, the vertical leg of which is aligned with the bore of the filling tube 709. The water flowing down through the filling tube will pass out of the lower end thereof through the radial apertures 755 in the conical fitting 712 at the lower end of the tube. Since the pressure in the bottle, as established by the counter-pressure step, is the same as that above the body of charged water in the filling reservoir 147, the water will flow into the bottle at a slow rate and without becoming agitated.

The provision of the plug valve 757 in the valve chamber 724 permits the amount of water flowing through the filling circuit to be closely regulated.

The raising of the counter-pressure valve 720 by the high surface 755 on its cam 727 will cause this valve to be raised sufficiently high in its chamber to come opposite and close the restricted port 746 in the upper horizontal gas passage 743 so that there can be no flow through this passage. However, the valve 720, being raised from its seat 739, will permit gas and air to be vented back to the filling reservoir 147 from the bottle being filled. In this venting flow, the gas and air from the bottle enter the passage 749 between the sleeve 710 and tube 709 through the aperture 750 in the lower end of the tube 710 and will pass up through passage 748 and angled passage 747, to the valve chamber 723 in a reverse direction to that indicated by the arrows in Figure 20. From the valve chamber 723, the gas and air will flow through the lower horizontal passage 744 to the pipe line 442.

This venting flow and the flow of water into the bottle will continue until the level of the water in the bottle reaches the aperture 750 of the tube 710 included in the filling nozzle. When the level of the water has raised to such an extent that the aperture 750 is closed thereby, no more gas and air can be vented from the bottle and the flow of water into the bottle will terminate. A slight quantity of water may flow upwardly through the venting passages controlled by the counter-pressure valve 720 but this passage is of such slight diameter and the gas pipe 442 is of such diameter and configuration, all as explained in connection with our disc type filling valve, that only a very limited quantity of water may flow in this manner. Furthermore, as has been explained in connection with the disc valve type of filling head, the timing of the machine is such that at about the moment when the water has reached the proper level in the bottle, the rotation of the filling mechanism will have moved the filling head being described to a position where it will be operated by the snifting trip.

As is shown in Figure 19, a ball check valve 770 is provided in the enlarged inner end of the passage 768 which communicates with the water pipe 443. In the event that a bottle should be broken during the filling step, and if the bottle breaks in the usual manner so that it collapses, the cam plate 702 will drop to its downward position by reason of the dropping of the centering bell 704. This downward movement of the cam plate 702 will permit all of the valves in the head to move to closed position, thereby obviating any possibility of water being wasted or of any gas flowing from the filling reservoir 147 through the passages which have previously been used in this step for venting the gas and air from the bottle. If the bottle should be broken but should fail to collapse so that the cam plate 702 cannot drop, the ball check valve 770 in the passage 768 will move to its seat upon the smaller portion of this passage and thereby stop the flow of water. Similarly, the ball check valve 745 in the gas passage 744 will be moved to closed position by the pressure of the released gas and will prevent any flow of gas through this passage.

The sleeve 710 used on the filling nozzle 703 is provided with an aperture 750' diametrically opposite to the aperture 750 and downwardly spaced upon the sleeve with respect to the latter aperture. This permits the filling nozzle to be used for filling bottles of various heights. If desired, an additional number of apertures may be provided in the sleeve 710 and spaced as desired to obtain any required range of filling heights.

When the filling head being described reaches the post-like counter-pressure trip, not shown, which would be positioned at 354 in Figure 1, the trip will contact with the radially projecting arm 771 of the cam plate 702, this arm having been moved to contacting position by the preceding turning of the cam plate. Contact of arm 771 with the snifting trip will cause the cam plate to be rotated to carry the cam surfaces thereof beneath the valve stems of the valves to move them to the positions which they respectively occupy during the snifting portion of the filling cycle.

The cam surface 729 will thereby be moved beneath the snifting valve 722 so that the incline 772 of that surface will move beneath the valve stem thereof to cause it to bear upon the raised portion 773 of the cam surface, opening the snifting valve against the action of a coil spring 772a, the upper end of which bears against a valve fitting 786 hereinafter described. The filling valve cam surface 728 will rotate beneath the filling valve 721 so that the stem of the latter will move down the incline 774 of the cam surface and will come to rest upon the lower portion 775 thereof. The counter-pressure valve cam surface 726 will move beneath the stem of the latter valve to cause it to move down the incline 776 to the lower surface 777.

The movement of the cam surfaces 727 and 728 described above will cause the counter-pressure valve 720 and the filling valve 721 to move downwardly to their respective seats 739 and 752 to closed position.

The snifting circuit will now be open to permit the excess pressure above the level of the liquid in the bottle to be vented to atmosphere. This excess pressure will move upwardly through passages 778 in the centering bell 704. From these passages the vented pressure will move into an annular chamber 779 in the lower end of the collar 706 and within the area defined by the packing 713; thence through an upwardly extending passage 780 in the collar 706, which passage is aligned with the lower end of an angled passage 781 extending through the valve body 701. The upper horizontal arm of the angled passage 781 opens into the snifting valve chamber 725 above the valve seat 782 of snifting valve 722. Since this valve is open, due to the fact that its valve stem 725 is positioned upon the raised surface 773 of the snifting valve cam surface 729, the snifted gases will be free to flow downwardly past the valve seat, as shown in Figure 20, and into an angled passage 783 which extends upwardly and opens, through a kerf 784, to an annular groove 785 about a valve fitting 786 (Figure 17). A horizontal port 787 extends through the fitting, which port is in communication with a vertical port 788 in the valve fitting. Port 788 is controlled by a needle valve 789 and gas passing the needle valve 789 moves through a horizontal port 790 in the valve fitting 786 to a passage 791 (Figure 20) to atmosphere.

The provision of the needle valve 789 in the snifting circuit permits the rate of snifting to be accurately regulated, the needle valve being provided with a knurled handle 792 and a lock nut 793 to respectively permit it to be turned and locked in the desired position.

If, during the snifting step, the bottle should explode and collapse, the cam plate 702 will drop to its downward position thereby closing the snifting valve, just as is the case during either of the other two steps of the filling operation. However, no gas or water from the filling reservoir could be wasted during this step since none of the passages of the filling head are in communication with the reservoir.

It will be noted that by the use of the reciprocable or poppet type valves used in the above filling head, the necessity of any means to render the filling head inoperative when no bottle is positioned beneath the filling head, is entirely eliminated, since if no bottle is positioned beneath the head, the cam plate 702 will remain in lower position and out of operative relation with the various valves of the filling head. A cam plate 702 in lowered position and moving about with the filling mechanism will successively contact with the counter-pressure, filling and snifting trips which cooperate with the filling mechanism and will be rotated to the successive positions described above, but will, as stated, not operate the valves. Since the cam plate 702 will be rotated by the various trips regardless of whether a bottle is positioned beneath it, there is no possibility of the cam plate getting out of step with respect to its proper cycle of operation.

As has been stated above, the cam plates 702 are of sufficient diameter and are provided with sufficient radial arms to cause the valves of the filling heads to which they are applied to operate through two complete filling cycles upon one rotation of the cam plate. The description of the operation of the cam plates which has been given above covers the movement of the cam plates during but one filling cycle and includes a description of the operation of only 180° of the circumferential cam surfaces. However, as will be observed from Figures 22 and 24, inclusive, the remaining 180° of the circumferential cam surfaces are identical with that which has already been described and this remaining portion of the cam surfaces will be brought into proper successive positions with the valves of the filling head by the three radially projecting arms 730 which have not been referred to in the above description.

As has been stated above, the posts or the like which contact with the radial arms 730 of the cam plate 702 to successively rotate the cam plate to its various positions may be of any desired diameter or height. In order to permit the filling mechanism to operate upon runs of bottles of various heights, it will only be necessary to position the filling reservoir and filling heads at the proper distance from the bottle platforms 67 by the adjusting mechanism illustrated in Figure 2. No adjustment of the trip posts which operate the cam plates of the filling heads will be necessary since, if the posts are of a suitable length, they will operate the radial arms 730 of the cam plates regardless of the vertical position of the arms resulting from vertical adjustment of the filling reservoir and filling heads.

*The means to transfer bottles from the filling mechanism to the crowning mechanism*

After the bottles have been shifted, the continued rotation of the filling mechanism will move them back toward the transfer spider 65. As the bottle supporting platforms 67 move along worktable 56, the roller 308 in each platform will move into engagement with the cam track 319, moving the bottle platform downwardly to the level of the worktable, as is shown in Figures 2 and 7. The timing of the rotation of the filling mechanism and the transfer spider is such that a bottle will be presented to each pocket 260 of the transfer spider as the pocket moves across a bottle supporting platform 67. In order to insure that the bottles are removed from the platforms 67, a guide member 525 is positioned upon the worktable 56 beneath the transfer spider and extends out over the path of the platforms 67 and beneath the bottle engaging members 320. As is best shown in Figure 1, the guide member 525 has the right hand face thereof curved to define the path of travel of the bottles from the platforms and into the pockets of the transfer spider. In order to hold the bottles in the transfer spider and guide their movement thereabout, a guide element 526 is adjustably fixed upon the surface of the worktable 56 adjacent the right hand side of the path of travel of the transfer spider. The bottles are moved by the transfer spider about the right hand side thereof and onto the table 68 of the crowning mechanism 53 into the pockets 527 of the crowning spider 69.

*The crowning mechanism*

The table 68 of the crowning mechanism 53 and the spider 69 thereof are of exactly the same construction as the table and spider of the syruping mechanism 51. The crowner 53 (Fig. 12) comprises four crowning heads 550 equidistantly spaced about the supporting structure 138 which is keyed to the rotating hollow shaft 55, the heads being vertically slidable in the supporting structure. The non-rotating post 136 within the hollow rotatable shaft 55 has a casting 551 fixed to its upper end, which casting is provided with a cam track 552 in which rollers 553 journaled upon stub axles 554 in the upper ends of the crowning heads rotate. The cam track 552 is of such configuration that the crowning heads will be raised as shown in Figure 12 as they move above the portion of the path of their travel at which bottles are received from the transfer spider and will descend upon the bottle received from the transfer spider to crown the same during their counterclockwise movement about the left hand side of the crowning mechanism. The crowning heads will rise again to clear the heads of the bottles as the bottles are rotated to the position where they are removed from the crowning mechanism by the outfeed spider 70.

Each crowning head 550 includes a vertical cylinder 557 provided with a block 558 at its upper end, the block being welded within the cylinder. The block 558 is provided with a transverse bore 559 in which the stub axle 554, referred to above, is held by a vertical set screw 560 extending through the upper portion of the block. An adjusting stem 561 extends downwardly through the cylinder 557, the upper end of the stem passing through the block 558 and the stub axle 554. The lower end of the stem is screw threaded and has fixed thereto a sleeve 562. Keys 563 are secured in slots 563a provided in diametrically opposite sides of an enlargement 566 of sleeve 562 by machine screws, not shown. The keys 563 are positioned in vertical keyways 564 adjacent the lower end of the cylinder 557. A relatively strong coil spring 565 is positioned in the cylinder 557, the lower end of the coil spring bearing upon the enlargement 566 on the sleeve 562 and its upper end bearing against the lower surface of the block 558. The enlargement 566 of sleeve 562 normally bears on the upper end of a sleeve 562a threaded in the lower portion of cylinder 557, as shown in Figure 12.

The stem 561 is provided with a squared head 567 which is adapted to be engaged by a wrench or other tool so that the stem 561 may be rotated with respect to the sleeve 562, such rotation of the stem adjusting the tension of the spring 565. A holding cap 568 may be positioned on the upper surface of the block 558 to normally hold the stem against rotation.

The lower end of the sleeve 562 is enlarged as shown at 569 and supports a tubular member 570, the upper portion of which is threaded into the sleeve 562. A skirted collar 571 is supported upon the lower face of member 570 by means of interengaging flanges and shoulders, not shown, the collar 571 being held in proper alignment with member 570 by means of pins 572. The upper surface of collar 571 forms a crowning platform and the space within the member 570 and having its lower portion defined by the crowning platform forms the crowning chamber of conventional type including a throat ring 573 and presser foot 574. The presser foot 574 includes a head 575 which rests upon the upper end of member 570 and is normally held in downward position by a coil spring 576 which is of less strength than spring 565.

The collar 571 is downwardly and outwardly flared in order to center and guide the movement of the mouths of bottles with respect to the crowning head. Caps are adapted to be supplied to the crowning platforms from a stationary crown hopper 577 supported upon the upper end of the post 136 and operated in the usual manner to supply crown caps to a chute 578 supported in a downward extension 579 of the hopper 577. The chute 578 is positioned at such a point with respect to the movement of the crowning heads that a crown cap will slide from the lower end of the chute into the crown receiving chamber of the crowning head after a bottle has been crowned and moved from the crowning mechanism 53 by the outfeed spider 70. The crown chute 578 is curved inwardly at its lower end, this end of the chute being adapted to be aligned in and with a cut-out portion 580 in the enlargement 569 of the sleeve 562 and in member 570 when the crowning heads are rotated adjacent thereto so that a cap will slide from the chute and upon the crowning platform. The vertical position of the upper surface or crowning platform of the collar 571 of each crowning head with respect to the lower end of crown supply chute 578 can be varied by rotation of collar 562a with respect to cylinder 557. Such rotation obviously varies the normal downward limit position of sleeve 562 with respect to cylinder 557 and, therefore, the position of crowning platform collar 571 with respect to chute 578, as clearly shown in Figure 12. When no crowning head is positioned opposite the lower end of the chute 578, the periphery of a circumferential flange 581 on supporting member 138 and which surrounds the heads in alignment with the lower end of the chute will be in contact with the lower end of the chute to prevent crowns from dropping from the latter (Figure 3).

The operation of the crowning heads is as follows: Rotation of the crowning mechanism in the manner described above will cause a cylinder 557 and the crowning elements at the lower end thereof to be moved downwardly about the mouth of the bottle. At the time of engagement of the crowning head with the bottle, a cap will be positioned in the crowning chamber of the head. Immediately after a bottle has been positioned beneath a head, the movement of that head with respect to the cam track 552 will cause the cylinder 557 to be moved downwardly. This movement will cause the presser foot 574 to contact with the upper surface of the cap, holding the same upon the mouth of the bottle. Continued downward movement of the cylinder will slide the throat ring 573 down about the edges of the cap on the bottle to mold and secure the latter upon the bottle. The presser foot 574 will move upwardly with respect to the throat ring against the action of the relatively light coil spring 576 and continued downward movement of the cylinder 557 will cause the throat ring 573, under the pressure of the strong spring 565, to crown the bottle in the usual manner. Further movement of the capping head with respect to the cam track 552, will cause the head to be moved upwardly and out of engagement with the mouth of the bottle.

Immediately after the completion of the crowning operation as described above, the bottles will be removed from the crowning mechanism by the outfeed spider 70, which will move the bottles in a clockwise direction, as shown in Figure 1, to position them upon the right hand end of the straight line conveyor 59. The spider 70 is of exactly the same construction as the infeed spider 61. An arcuate guide plate 588 surrounds the right hand portion of the outfeed spider 70 to guide the movement of bottles about this spider and a guide plate 589 extends along the inner side of the straight line conveyor, as shown in Figure 1, to assist in the guiding of bottles along this conveyor. A guiding member 590 is positioned along the outer side of the straight line conveyor 59 to guide the movement of bottles from the outfeed spider to the straight line conveyor. The guiding member 590 is pivoted to a bracket 591 and is normally held in proper position by a coil spring 592. A control valve 191 of the same construction as the control valve 170 at the infeed side of the machine will be actuated upon the occurrence of any jamming of bottles at the guide member 590 to cause the clutch of the machine to be disengaged in the manner already described in connection with Figure 5.

The filled and crowned bottles may be moved by the straight line conveyor 59 to any desired point of delivery.

It will be obvious from the above specification and drawings that our invention provides a filling machine as well as various mechanisms included therein which fulfill all of the stated objects of the invention and which are, in numerous other respects, marked improvements upon prior art machines and mechanisms.

It will be understood that the invention is not limited to the details of construction shown in the drawings and that the examples of the use of the machine and mechanisms which have been given do not include all of the uses of which they are capable and that the phraseology employed in the specification is for the purpose of description and not of limitation.

We claim:

1. The combination in a filing mechanism, of a moving filling head comprising a body portion having a plurality of flow passages therethrough, a reciprocable valve in each of said passages to control flow therethrough, a rotatable member carried by the filling head for operating the valves, and trip members spaced along the path of movement of the filling head and adapted to successively contact with the rotatable member to impart a step by step movement thereto.

2. The combination in a filling mechanism, of a moving filling head comprising a body portion having a plurality of flow passages therethrough, a reciprocable valve in each of said passages to control flow therethrough, a horizontally moving rotatable member carried by the filling head for operating the valves, and trip members spaced along the path of movement of the filling head and adapted to successively contact with the rotatable member to impart a step by step movement thereto.

3. The combination in a filling mechanism, of a moving filling head comprising a body portion having a plurality of flow passages therethrough, a vertically reciprocable valve in each of said passages to control flow therethrough, a horizontally rotatable member carried by the filling head to operate the valves, said member being adapted to be moved into operating engagement with the valves upon the positioning of a container in filling relation with respect to the filling head, and trip members spaced about the path of movement of the filling head and adapted to successively actuate the rotatable member to operate the valves.

4. The combination in a filling mechanism, of a moving filling head comprising a body portion having a plurality of flow passages therethrough, a vertically reciprocable valve in each of said passages to control flow therethrough, a rotatable member carried by the filling head and having a plurality of cam surfaces thereon, each cam surface being adapted to move in alignment with one of said valves, and trip members spaced along the path of movement of the filling head and adapted to successively contact with the rotatable member to impart a step by step movement thereto.

5. In a container supporting element for filling machines, a platform including an upright fixed pin and a pin including an axially movable head, means to urge said movable head toward said platform, and a container engaging element having an aperture therein arranged to fit on said fixed pin and a slot adapted to engage said other pin, said slot having a depression at its inner end in which said axially movable head is adapted to seat.

6. In a filling mechanism, a filling head including a body portion having a flow passage therein, a valve to control flow through the passage, a container engaging element vertically reciprocable with respect to said body portion, valve actuating means carried by said body portion and rotatable with respect to said valve, said valve actuating means being adapted to be brought into engagement with said valve by the positioning of a container in filling position with respect to the filling head, and means to rotate said valve actuating means.

7. In a filling mechanism, a moving filling head including a body portion having a flow passage therein, a valve to control flow through the passage, a container engaging element vertically reciprocable with respect to said body portion, valve actuating means relatively movable with respect to said element, said valve actuating means being adapted to be brought into engagement with said valve by the positioning of a container in filling position with respect to the filling head, and trip means carried by the filling mechanism in the path of movement of the filling head to operate said valve actuating means.

8. In a filling mechanism, a moving filling head including a body portion having a flow passage therein, a valve to control flow through the passage, a container engaging element vertically reciprocable with respect to said body portion, valve actuating means rotatable with respect to said element, said valve actuating means being adapted to be brought into engagement with said valve by the positioning of a container in filling position with respect to the filling head, and trip means carried by the filling mechanism in the path of movement of the filling head to rotate said actuating means.

9. In a filling mechanism, a moving filling head including a body portion having a flow passage therein, a valve to control flow through the passage, a container engaging element vertically reciprocable with respect to said body portion, cam means mounted to rotate axially of said element, said cam means being adapted to be brought into engagement with said valve by the positioning of a container in filling position with respect to said container engaging element, and trip means carried by the filling mechanism in the path of movement of the filling head to rotate said cam means.

10. In a filling mechanism, a filling head including a body portion having a flow passage therein, a valve to control flow through the passage, a container engaging element vertically reciprocable with respect to said body portion, an annular valve actuating member vertically reciprocable and rotatable upon said body portion, said valve actuating member being adapted to be brought into engagement with said valve by the positioning of a container in filling position with respect to the filling head, and means to rotate said valve actuating means.

GEORGE J. HUNTLEY.
ROBERT J. STEWART.